(12) United States Patent
Nakamura et al.

(10) Patent No.: US 10,839,218 B2
(45) Date of Patent: Nov. 17, 2020

(54) AUGMENTED REALITY DISPLAY SYSTEM, PROGRAM, AND METHOD

(71) Applicant: DWANGO Co., Ltd., Tokyo (JP)

(72) Inventors: Kouichi Nakamura, Tokyo (JP); Kazuya Asano, Tokyo (JP)

(73) Assignee: DWANGO CO., LTD. (JP)

( * ) Notice: Subject to any disclaimer, the term of this patent is extended or adjusted under 35 U.S.C. 154(b) by 0 days.

(21) Appl. No.: 16/617,193

(22) PCT Filed: Mar. 9, 2018

(86) PCT No.: PCT/JP2018/009280
§ 371 (c)(1),
(2) Date: Jan. 30, 2020

(87) PCT Pub. No.: WO2018/216312
PCT Pub. Date: Nov. 29, 2018

(65) Prior Publication Data
US 2020/0160055 A1 May 21, 2020

(30) Foreign Application Priority Data
May 26, 2017 (JP) .................... 2017-104156

(51) Int. Cl.
*G06K 9/00* (2006.01)
*A63F 13/213* (2014.01)
(Continued)

(52) U.S. Cl.
CPC ........ *G06K 9/00671* (2013.01); *A63F 13/213* (2014.09); *A63F 13/216* (2014.09);
(Continued)

(58) Field of Classification Search
CPC ... G06K 9/00671; A63F 13/216; G06T 17/05; G06T 2207/10028; G09B 29/10
See application file for complete search history.

(56) References Cited

U.S. PATENT DOCUMENTS

2015/0279103 A1 10/2015 Naegle et al.
2016/0117860 A1* 4/2016 Fei ............................ G06F 3/16
345/419
(Continued)

FOREIGN PATENT DOCUMENTS

JP 2003143478 A 5/2003
JP 2006047085 A 2/2006
(Continued)

OTHER PUBLICATIONS

Pokemon GO Strategies, Oct. 5, 2016 (available at https://app.famitsu.com/20160706_767349).
(Continued)

*Primary Examiner* — Grace Q Li
(74) *Attorney, Agent, or Firm* — Bracewell LLP; Douglas F. Stewart; Patrick J. Connolly

(57) ABSTRACT

An augmented reality displaying system for displaying a virtual object through compositing on an image taken of the real world, comprising: a camera for capturing an image of the real world; a location information acquiring portion for acquiring, as location information, the coordinates and orientation at the instant of imaging by the camera; an image analyzing portion for analyzing, as depth information, the relative distances to imaging subjects for individual pixels that structure the real world image that has been captured; a virtual display data generating portion for generating virtual display data, on real map information that includes geographical information in the real world, based on the location information acquired by the location information acquiring portion; and a compositing processing portion for displaying the virtual display data, generated by the virtual display data generating portion, superimposed on an image captured by the camera in accordance with the depth information.

3 Claims, 16 Drawing Sheets

(51) Int. Cl.
*A63F 13/216* (2014.01)
*A63F 13/52* (2014.01)
*A63F 13/655* (2014.01)
*G06T 7/73* (2017.01)
*G06T 17/05* (2011.01)
*G06T 19/00* (2011.01)
*G09B 29/10* (2006.01)

(52) U.S. Cl.
CPC ............ *A63F 13/52* (2014.09); *A63F 13/655* (2014.09); *G06T 7/74* (2017.01); *G06T 17/05* (2013.01); *G06T 19/006* (2013.01); *G09B 29/10* (2013.01); *G06T 2207/10028* (2013.01)

(56) References Cited

U.S. PATENT DOCUMENTS

| | | | |
|---|---|---|---|
| 2018/0075590 A1* | 3/2018 | Yamasaki | H04N 5/272 |
| 2018/0205884 A1* | 7/2018 | Hornung | H04N 13/243 |

FOREIGN PATENT DOCUMENTS

| | | |
|---|---|---|
| JP | 2006053694 A | 2/2006 |
| JP | 2006510465 A | 3/2006 |
| JP | 2013197881 A | 9/2013 |
| JP | 2014045655 A | 3/2014 |
| JP | 2014513822 A | 6/2014 |
| JP | 2015114757 A | 6/2015 |

OTHER PUBLICATIONS

JP2017-104156 Decision to Grant a Patent dated Oct. 17, 2017; 2 pgs.
JP2017-104156 Notice of Reasons for Refusal dated Dec. 20, 2017; 2 pgs.
PCT/JP2018/009280 International Search Report dated Apr. 10, 2018; 1 pg.
EPO English Translation of claims 1-6 of JP6275310, retrieved from eSpacenet.

* cited by examiner

[FIG. 1]
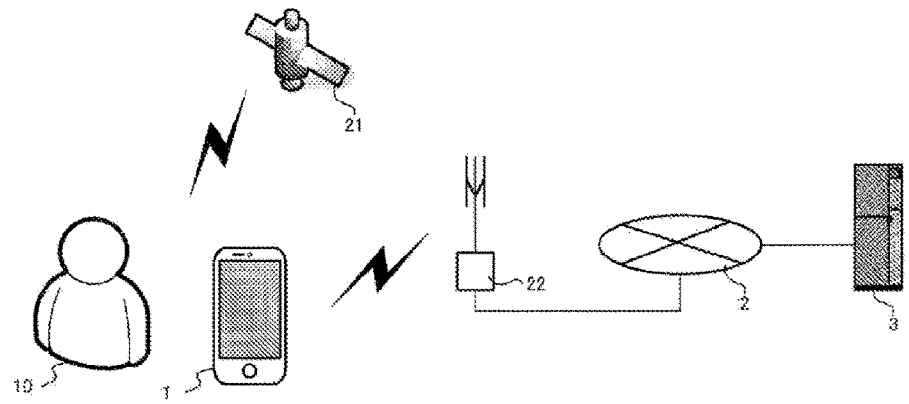
[FIG. 2]
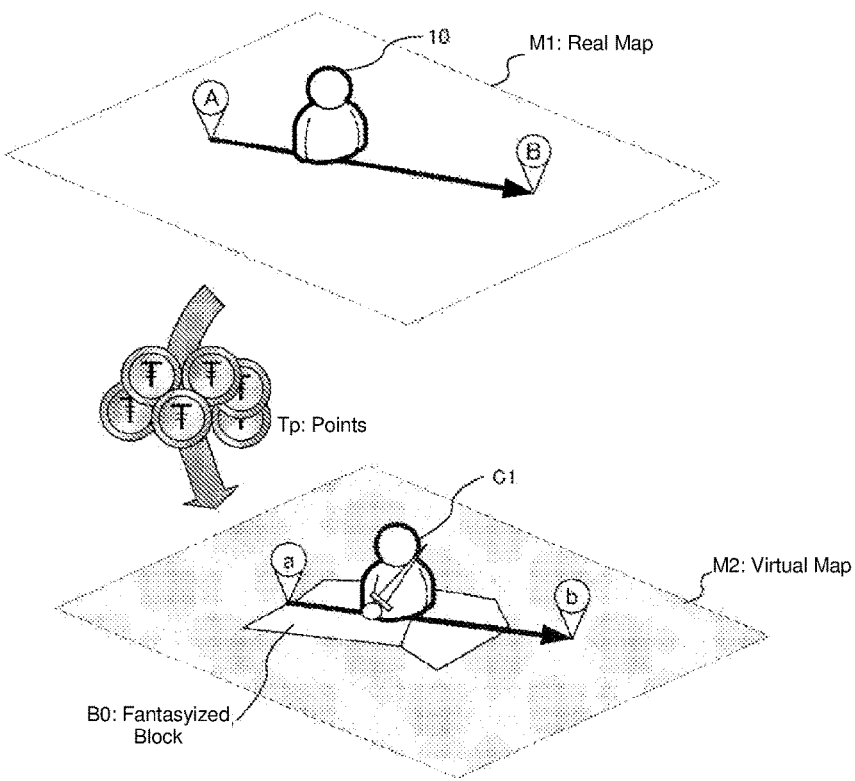

[FIG. 3]
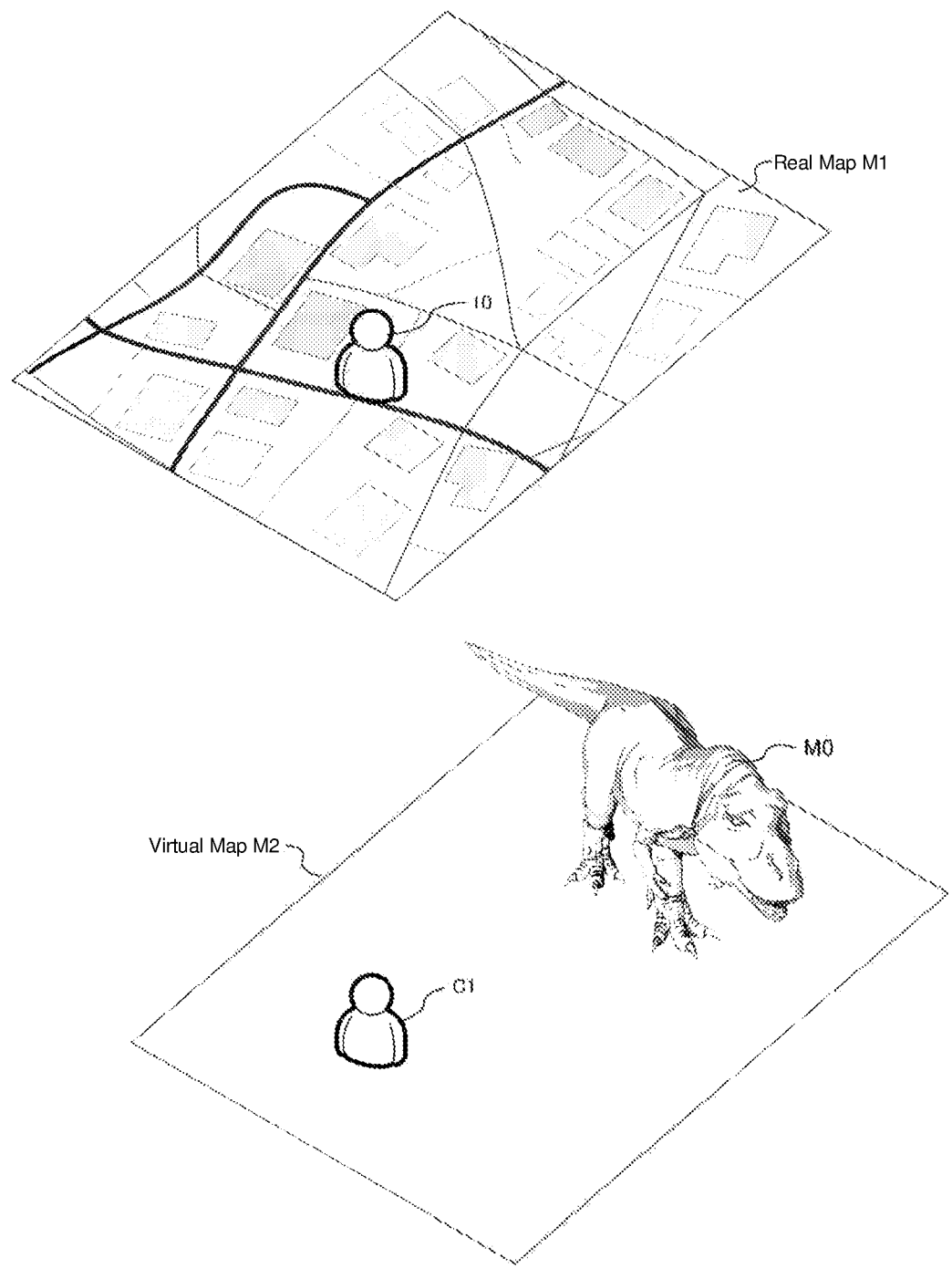

[FIG. 4]
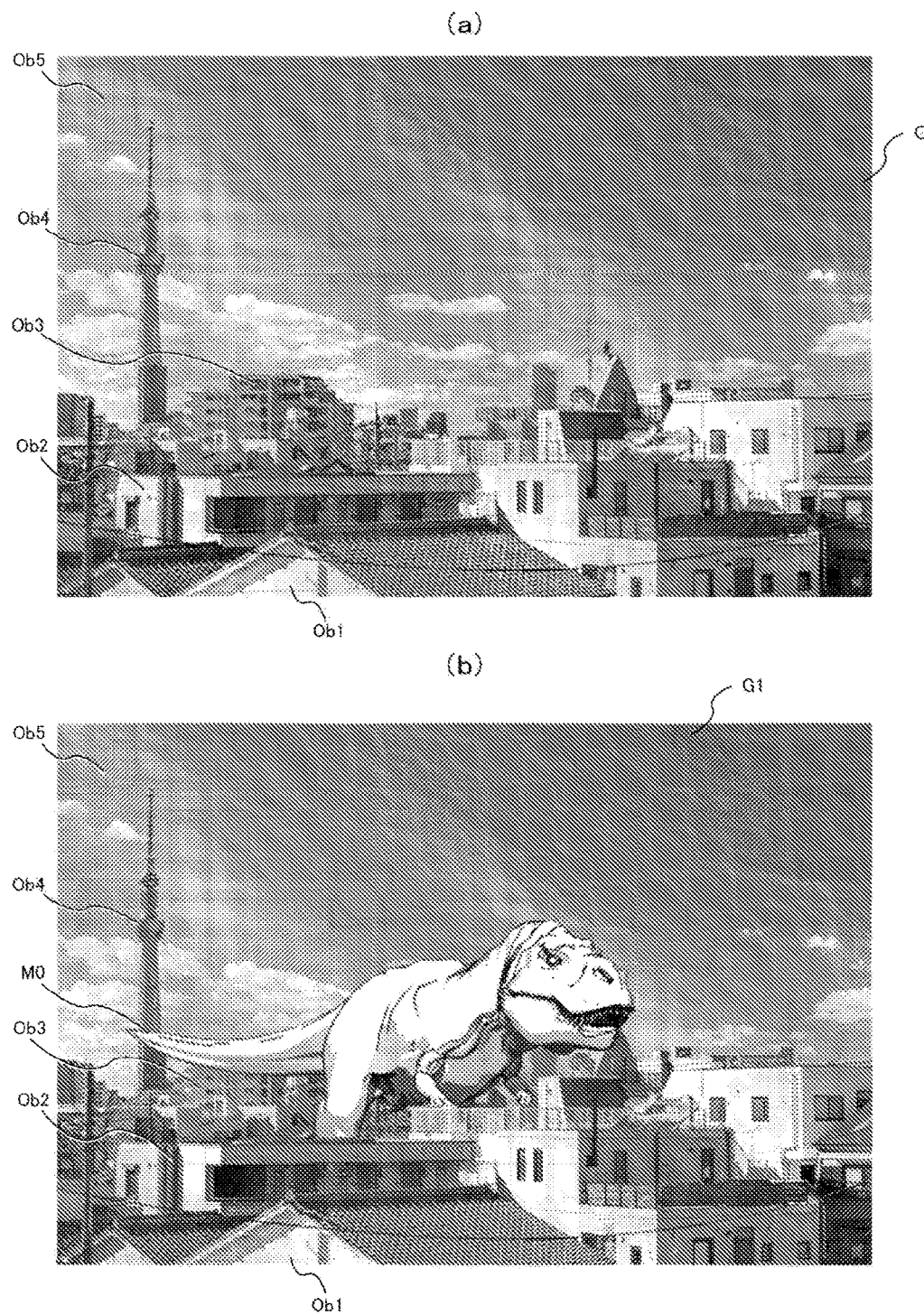

[FIG. 5]
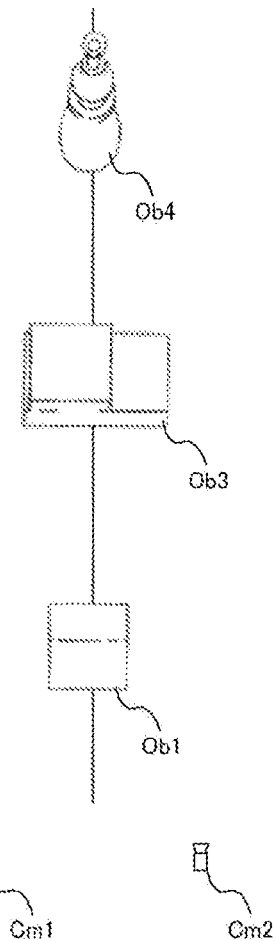
[FIG. 6]
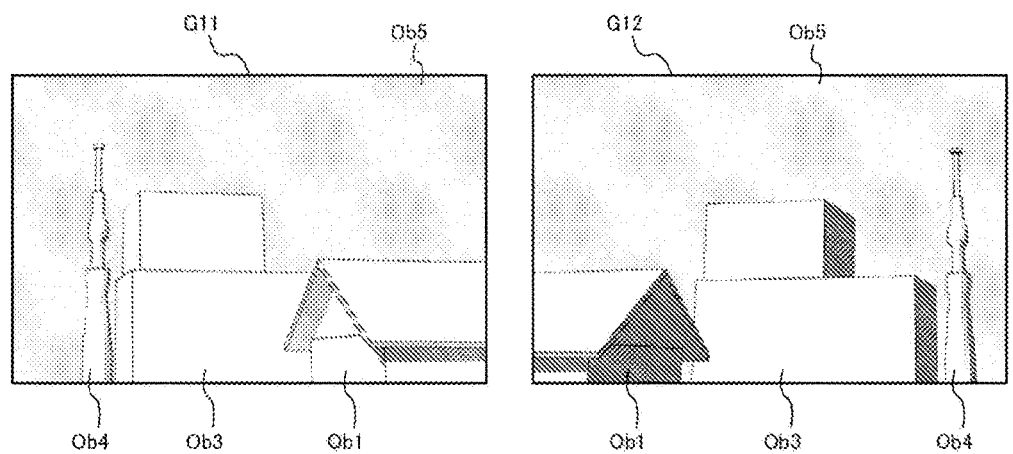

[FIG. 7]
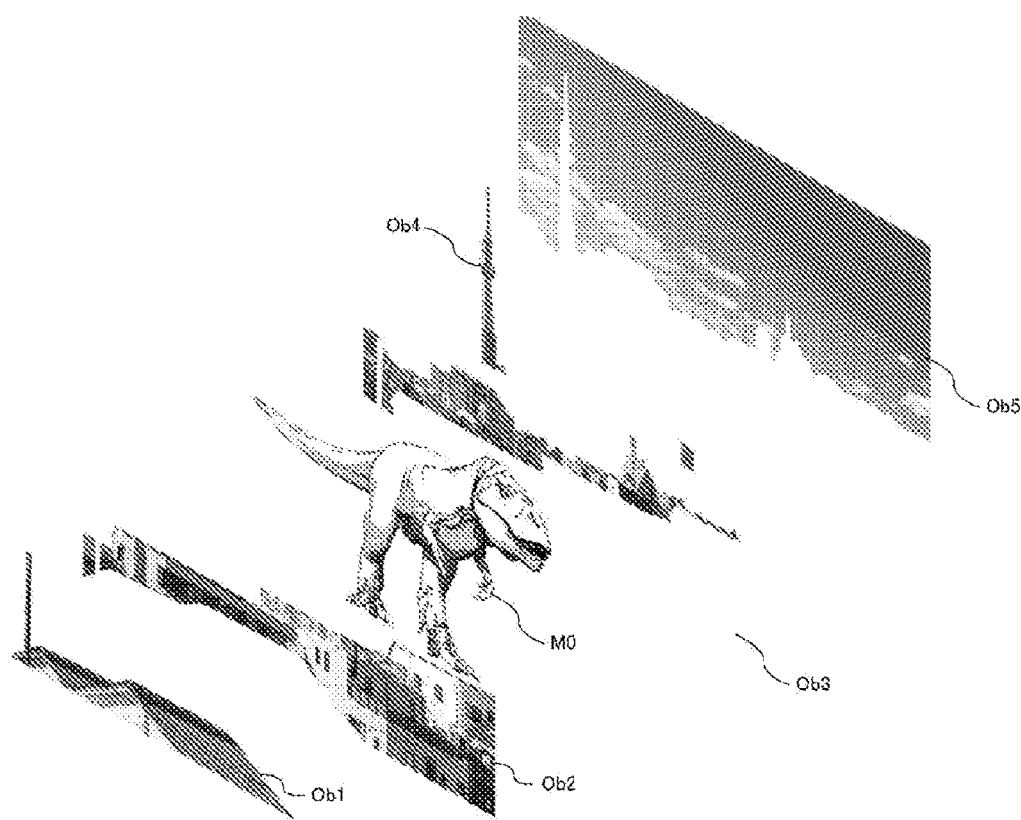

[FIG. 8]
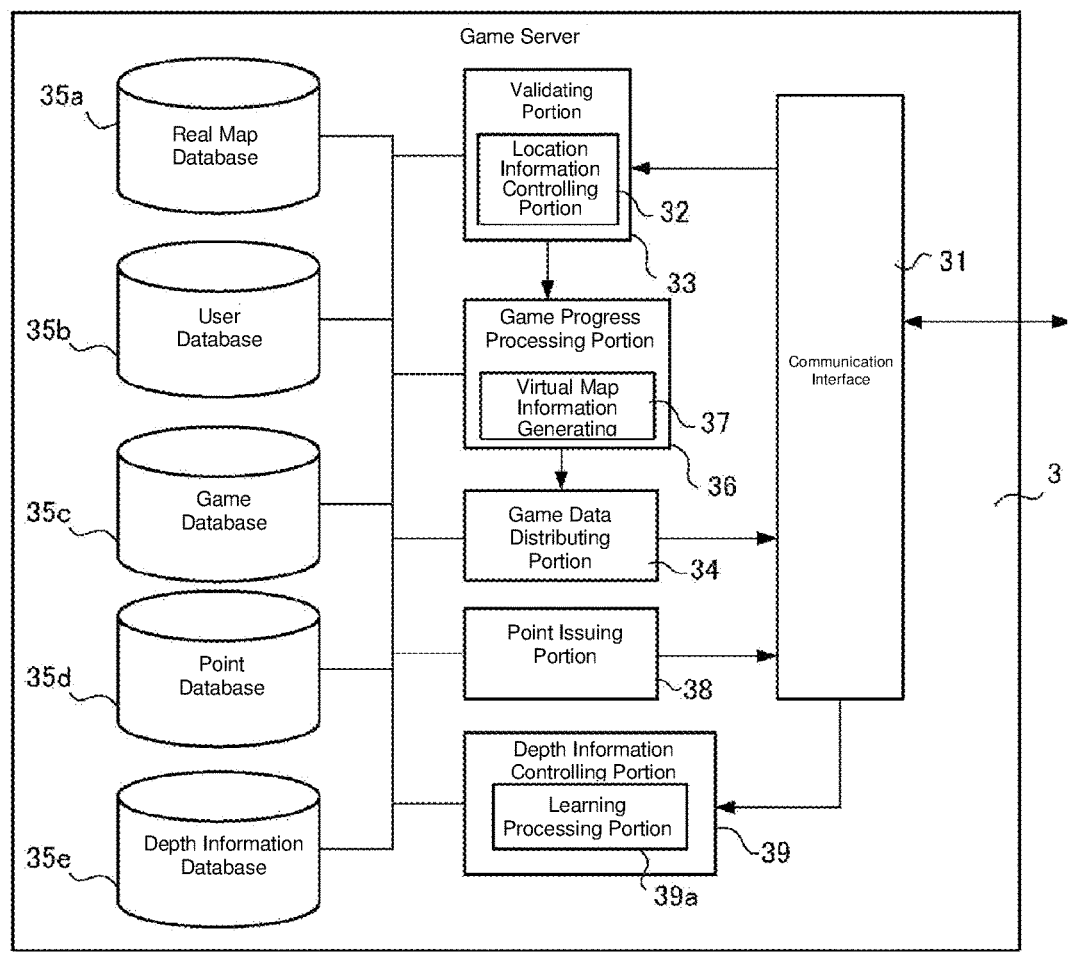

[FIG. 9]
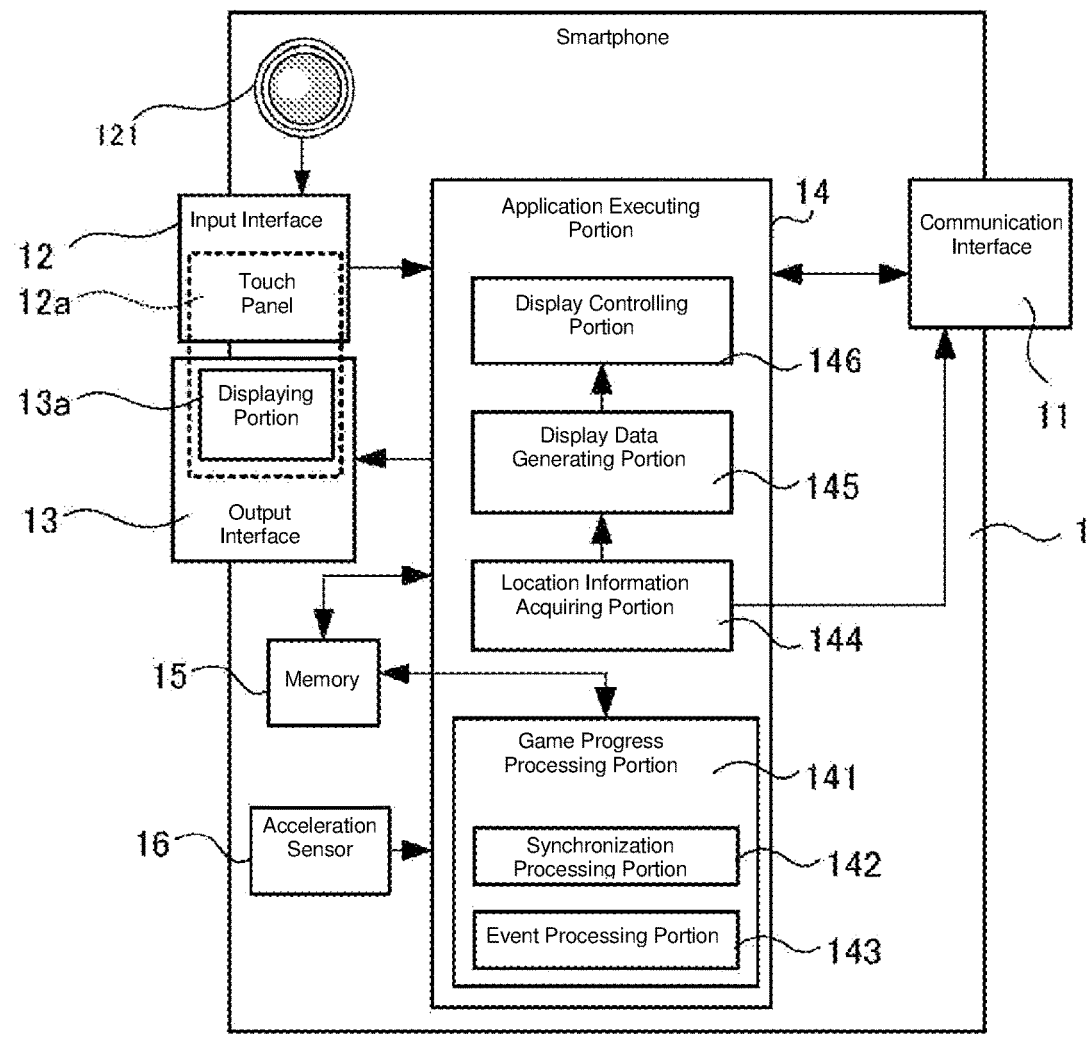

[FIG. 10]
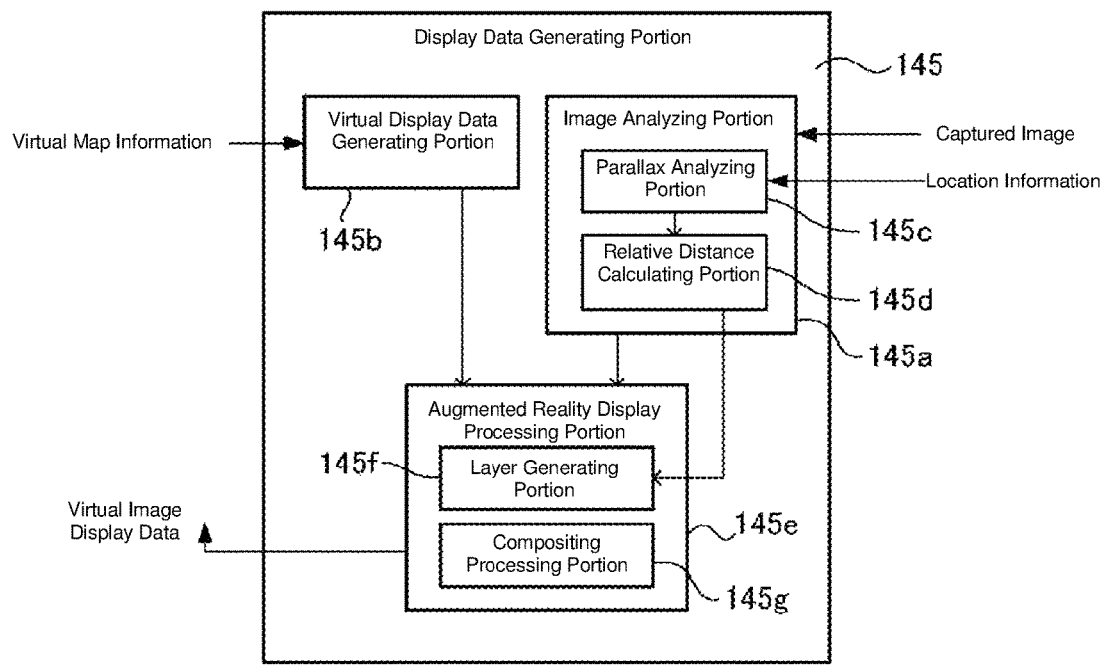

[FIG. 11]
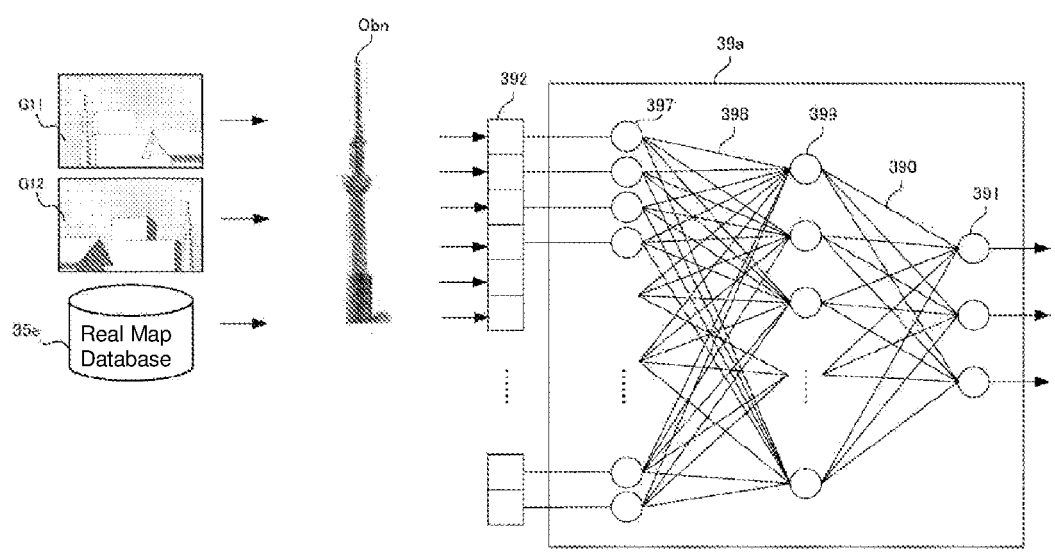

[FIG. 12]
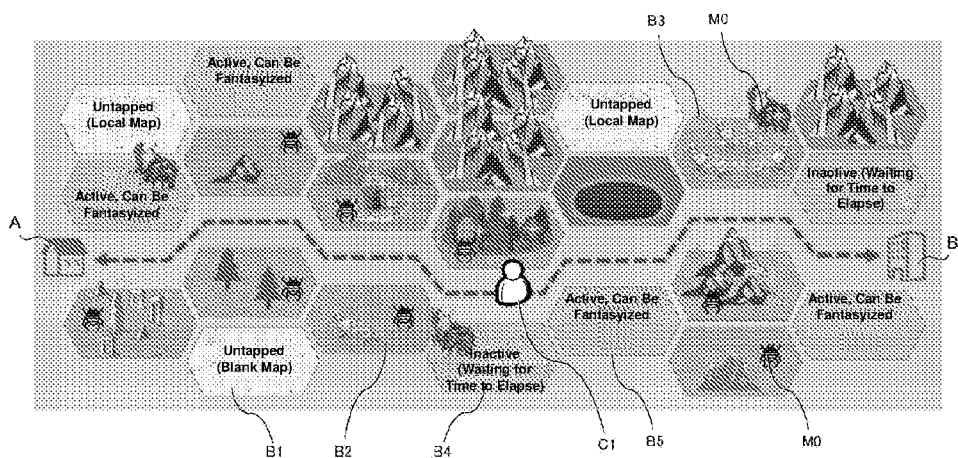

[FIG. 13]
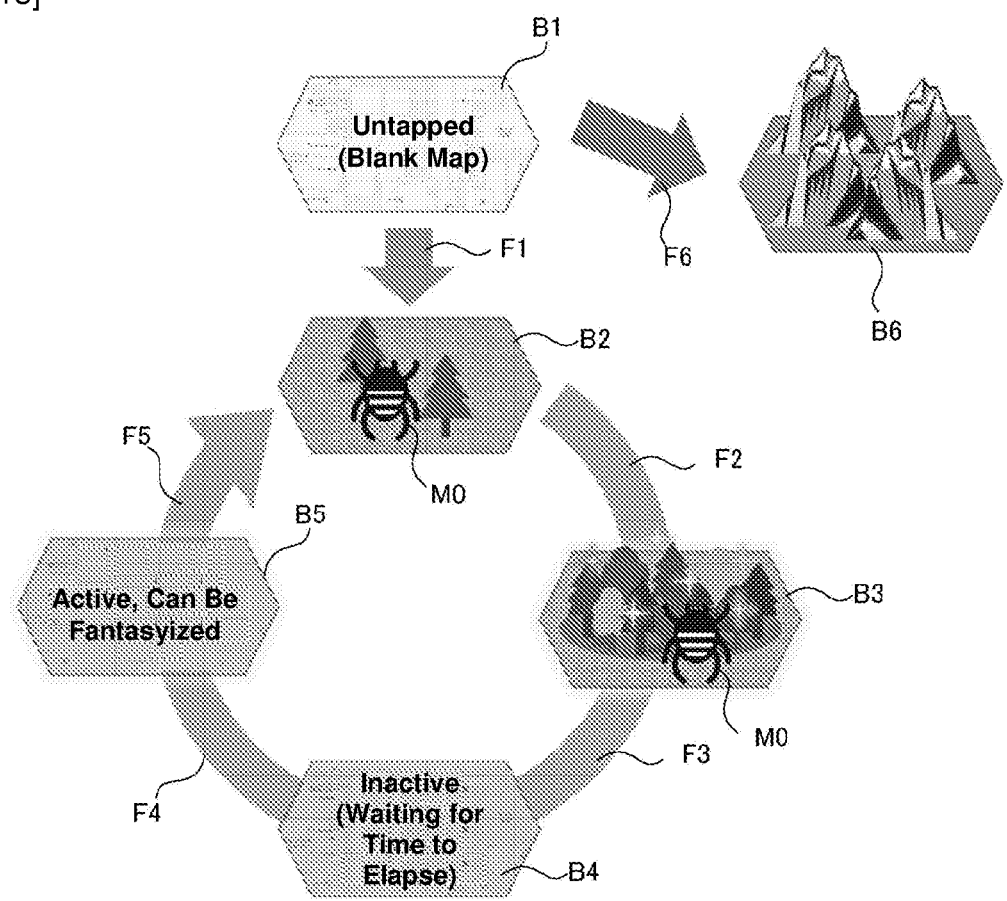

[FIG. 14]
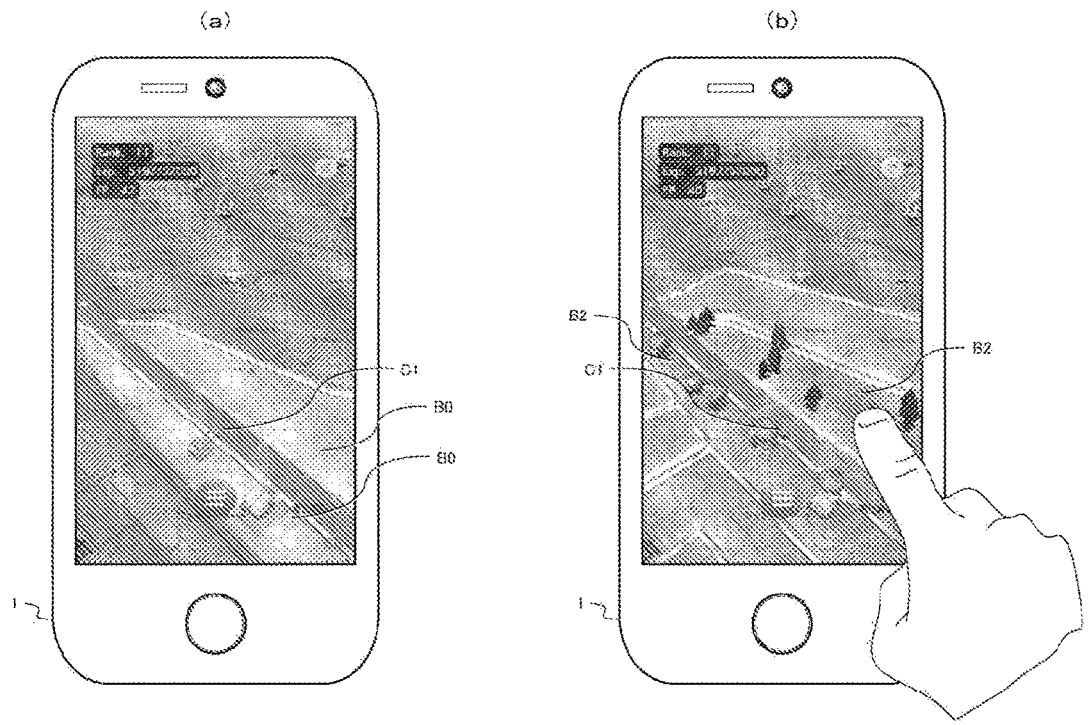
[FIG. 15]
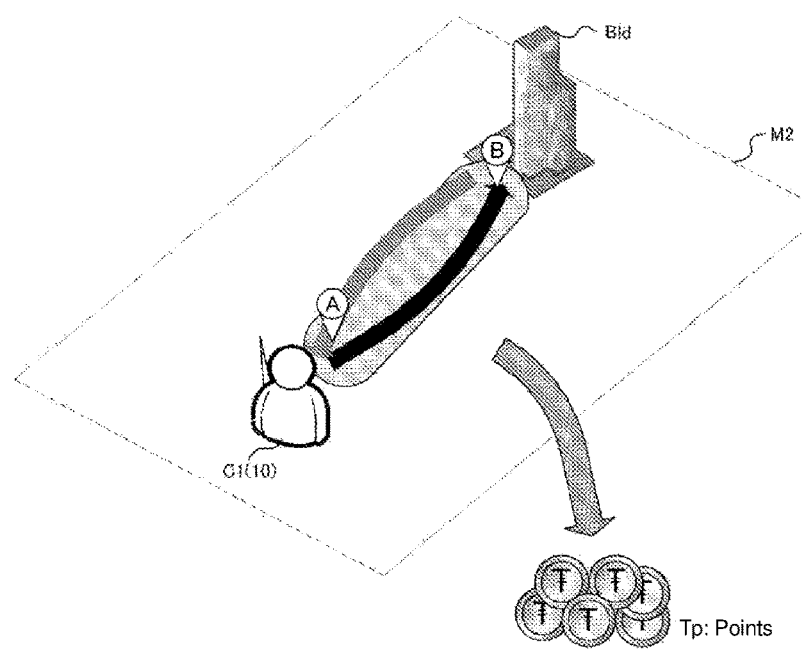

[FIG. 16]
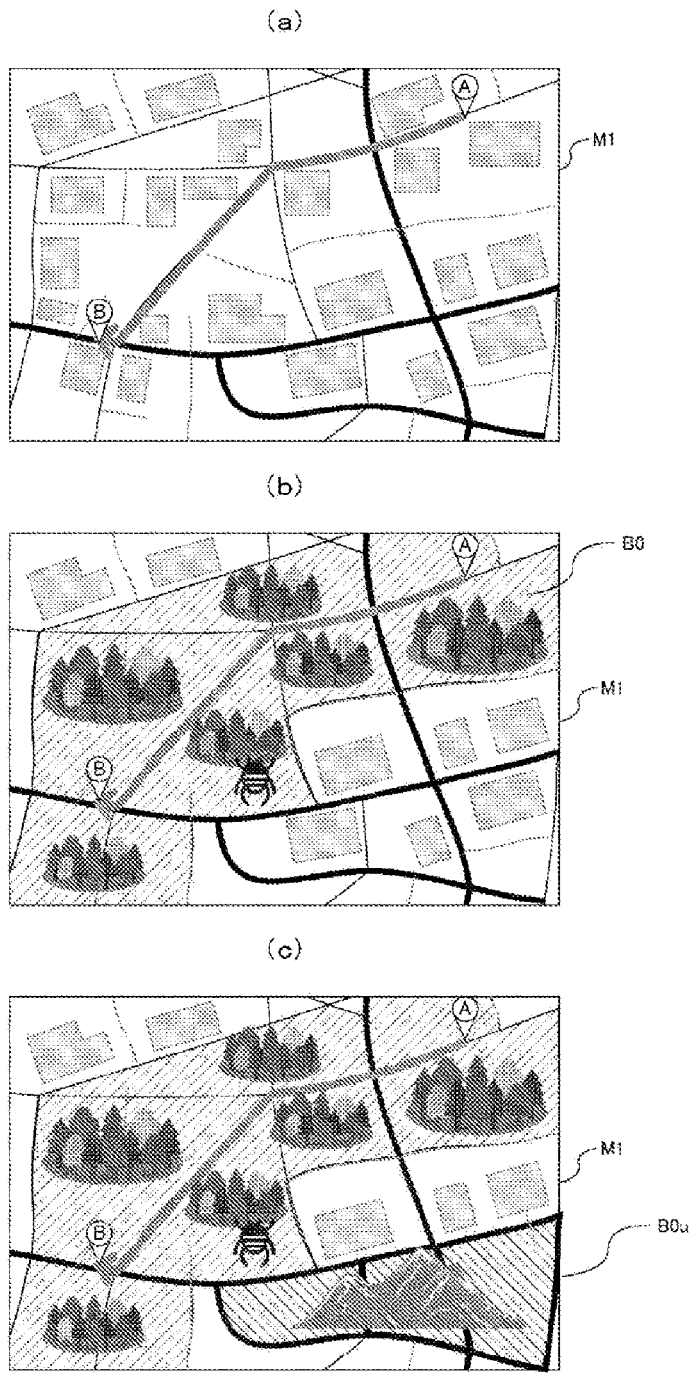

[FIG. 17]
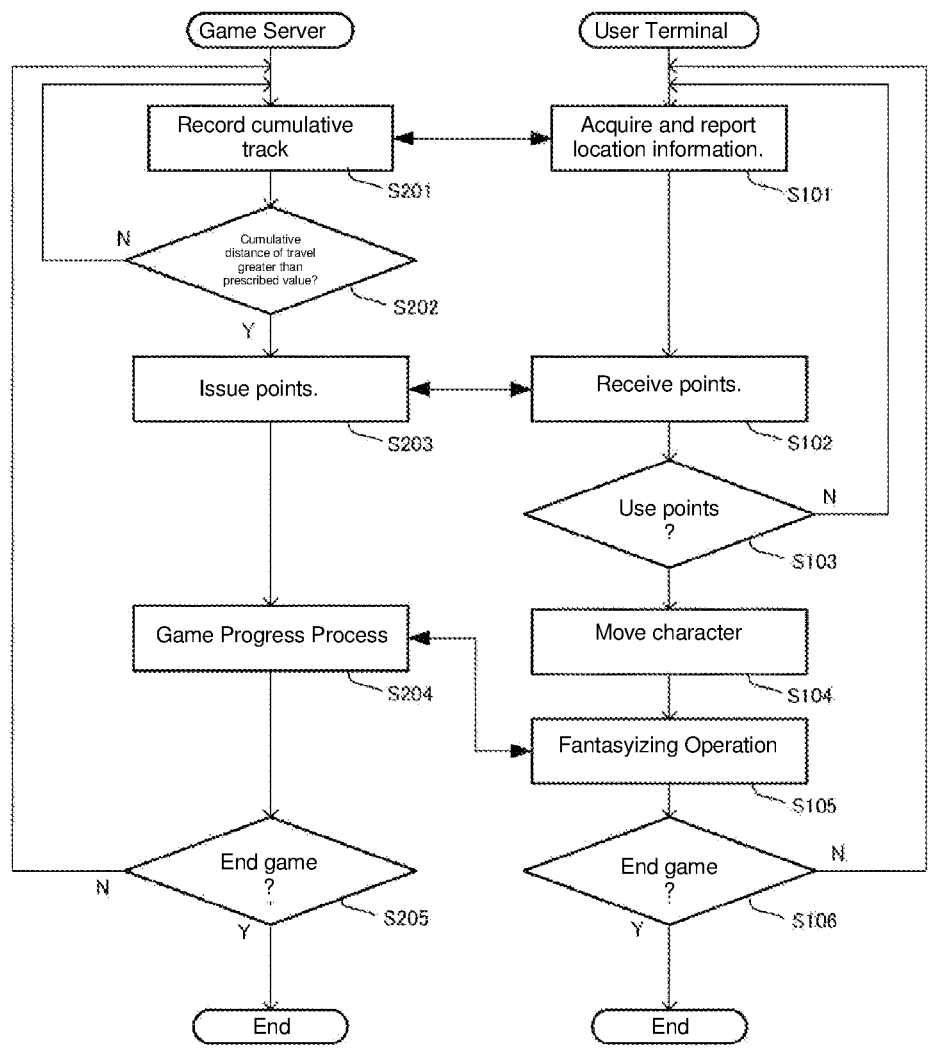

[FIG. 18]
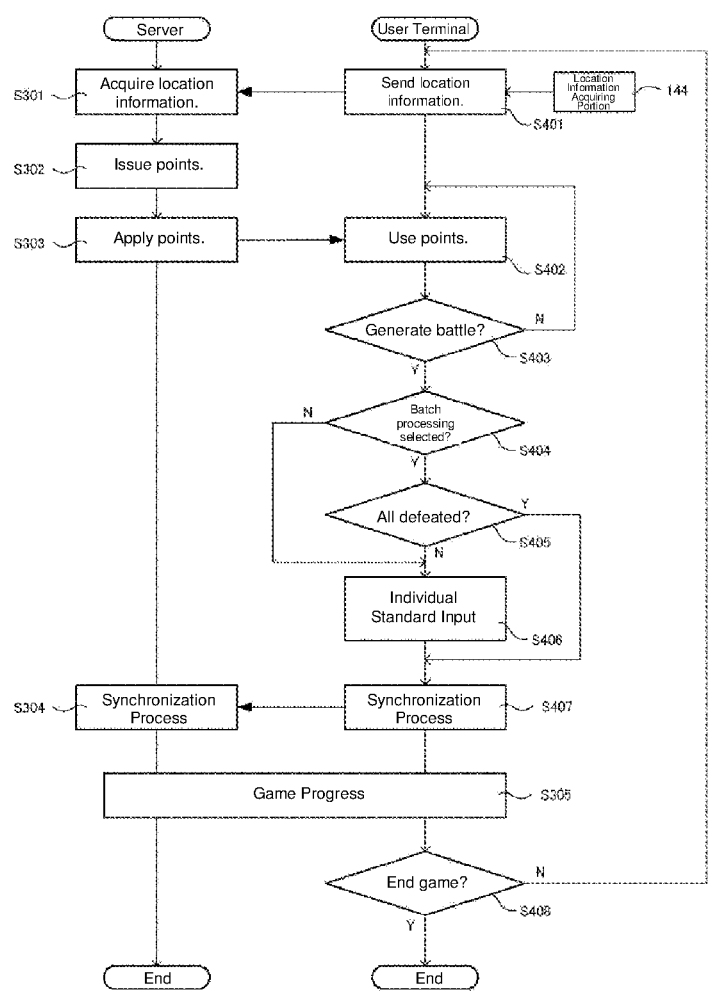

[FIG. 19]
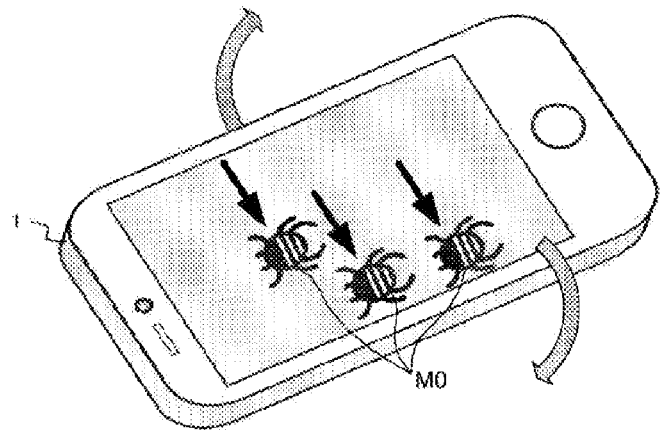
[FIG. 20]
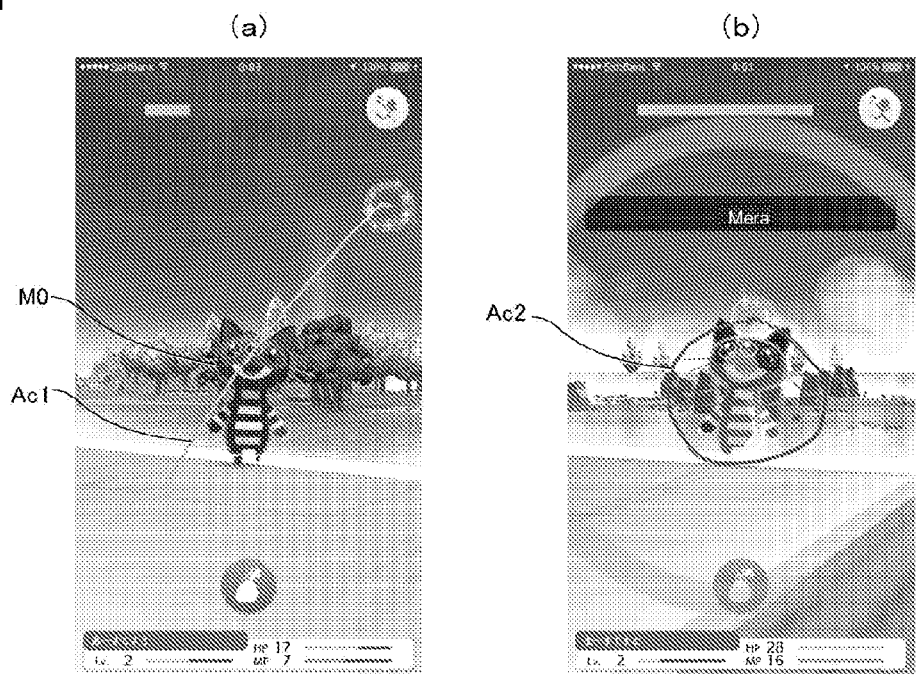

AUGMENTED REALITY DISPLAY SYSTEM, PROGRAM, AND METHOD

FIELD OF TECHNOLOGY

The present invention relates to an augmented reality displaying system, program, and method, for displaying virtual objects through compositing on an image captured of the real world.

Conventionally, with the rising popularity of portable information processing devices, such as smartphones, mobile telephones, mobile PCs, and the like, which carry out data communication through wireless communication, there have been advances in multifunctionality, such as the ability to use location information services such as GPS.

PRIOR ART

In recent years, a variety of so-called location-based games have been proposed that take advantage of the portability and location information services of such information processing devices (such as, for example, in Patent Document 1). In the technology disclosed in Patent Document 1, a game system is structured wherein the current location and travel in the real world, obtained through a GPS, or the like, is displayed and controlled, as a virtual location and virtual travel on a screen displayed in a role-playing game (a virtual world), and when the location is on an event icon, a second virtual world is displayed. This enables provision of a system that achieves a new form of entertainment that uses the location information, through combining the real location information with a conventional game system or a game system that has not existed conventionally, enabling enjoyable exercise wherein pedestrians actually travel.

PRIOR ART DOCUMENTS

Patent Documents

Patent Document 1: Japanese Unexamined Patent Application Publication 2001-70658

DISCLOSURE OF THE INVENTION

Problem Solved by the Present Invention

However, in location-based games that are linked to the location information service, described above, there are also many that include an "augmented reality" (AR) displaying function for displaying buildings and characters through compositing on the scenery at the current location of the user, in the production of the game when there are buildings, characters, creatures, or the like, that appear in virtual. Through such an augmented reality display function, the scenery around the current location of the user is imaged by a camera that is provided in a smartphone or a game machine, and an image rendered in computer graphics is composited onto the captured real image to provide an image as if the characters, or the like, actually exist in the surrounding scenery, to enable augmentation of the "reality" of the game.

In such a location-based game, in some cases the virtual buildings or characters will exist far from the current location of the user, and when compositing such buildings or characters onto the real image, it is necessary to express depth through superimposition by placement of the foreground scenery or the background scenery, in front of or behind the buildings that are to be composited. However, because the image captured by the camera is two-dimensional data, information for a sense of depth and for the front/back relationships of the objects that appear in the image is not included, and thus it is difficult to express depth as described above.

Given this, the present invention is to solve problems such as described above, and the object thereof is to provide an object controlling system, program, and method that is able to improve entertainment value through achieving diversification in augmented reality through displaying appropriately a sense of distance and front/back relationships for imaging subjects in an image through a simple process when superimposing and compositing, into a real world image, virtual objects through an augmented reality displaying function in a location-based game based on location information.

Means for Solving the Problem

In order to solve the issue set forth above, a system in the present invention is an augmented reality displaying system for compositing and displaying a virtual object onto an image wherein the real world has been imaged, comprising:
an imaging portion for capturing an image of the real world;
a location information acquiring portion for acquiring, as location information, coordinates and orientation at the moment at which an image is captured;
an image analyzing portion for analyzing, as depth information, relative distances to imaging subjects of individual pixels that structure the real-world image that has been captured;
a virtual display data generating portion for generating virtual display data that expresses the state of placement of virtual objects on real map information that includes geographical information in the real world, based on location information acquired by the location information acquiring portion; and
a compositing processing portion for displaying the virtual display data, generated by the virtual display data generating portion, superimposed on the image that has been captured by the imaging portion.

Moreover, the present invention is an augmented reality displaying program for compositing and displaying a virtual object on an image wherein the real world has been captured, for causing a computer to function as:
an imaging portion for capturing an image of the real world;
a location information acquiring portion for acquiring, as location information, coordinates and orientation at the moment at which an image is captured;
an image analyzing portion for analyzing, as depth information, relative distances to imaging subjects of individual pixels that structure the real-world image that has been captured;
a virtual display data generating portion for generating virtual display data that expresses the state of placement of virtual objects on real map information that includes geographical information in the real world, based on location information acquired by the location information acquiring portion; and
a compositing processing portion for displaying the virtual display data, generated by the virtual display data generating portion, superimposed on the image that has been captured by the imaging portion.

Furthermore, the present invention is an augmented reality displaying method for compositing and displaying a virtual object on an image wherein the real world has been captured, including:

a step wherein an imaging portion captures an image of the real world and wherein a location information acquiring portion acquires, as location information, coordinates and orientation at the moment at which the image is captured by the imaging portion;

a step wherein a virtual display data generating portion generates virtual display data that expresses the state of placement of virtual objects on real map information that includes geographical information in the real world, based on location information acquired by the location information acquiring portion; and a step wherein a compositing processing portion displays the virtual display data, generated by the virtual display data generating portion, superimposed on the image that has been captured by the imaging portion.

Note that in the present invention, a layer generating portion may also be provided for distributing the individual pixels that structure the image into a plurality of layers that form a hierarchy in the direction of depth of the image, based on the respective depth information thereof, where the compositing processing portion may superimpose the virtual display data in accordance with the relative distances between the imaging portion and the virtual object, based on the location information and in accordance with the layers generated by the layer portion.

In the invention set forth above, the image analyzing portion may calculate the relative distances to the imaging subjects based on parallax of the images at at least two points that are physically separated. Moreover, in the invention set forth above, a learning processing portion, for storing, as correlation information, the correlation between information regarding the relative distances calculated by the image analyzing portion, location information, and colors of pixels that structure the image may be provided, and positions within the image, wherein the image analyzing portion references the correlation information to analyze the depth information.

Moreover, in the present invention, information regarding shapes or height of buildings or topographic features that are located on a real map may be included in the real map information, and a function may be included for correcting the correlation information based on these information regarding shapes or heights of buildings or topographic features that is included in the real map information.

BRIEF DESCRIPTIONS OF THE DRAWINGS

FIG. 1 is a conceptual diagram depicting the overall structure of a game system in an embodiment.

FIG. 2 is an explanatory diagram depicting the relationship between real map information M1 and virtual map information M2 in an embodiment.

FIG. 3 is an explanatory diagram depicting the relationship between a user location in the real map information M1 and an object in the virtual map information M2 in an embodiment.

FIG. 4 is an explanatory diagram depicting a real image and an augmented reality display according to an embodiment.

FIG. 5 is an explanatory diagram depicting a process for analyzing depth information in an embodiment.

FIG. 6 is an explanatory diagram depicting a process for analyzing depth information in an embodiment.

FIG. 7 is an explanatory diagram depicting layer processing in the process for analyzing depth information in an embodiment.

FIG. 8 is a block diagram depicting the internal configuration of a game server 3 in an embodiment.

FIG. 9 is a block diagram depicting the internal structure of a smartphone 1 in an embodiment.

FIG. 10 is a block diagram depicting the internal structure of a display data generating portion in an embodiment.

FIG. 11 is an explanatory diagram depicting a summary of an identifying process through an identifying function module in an embodiment.

FIG. 12 is an explanatory diagram depicting the relationship between character travel and a fantasyizing process in an embodiment.

FIG. 13 is an explanatory diagram depicting the state transitions in the fantasyizing process according to the embodiment.

FIG. 14 is an explanatory diagram depicting the operation of the fantasyizing process in an embodiment.

FIG. 15 is an explanatory diagram regarding accumulation of points through repetitive round-trip travel in an embodiment.

FIG. 16 is an explanatory diagram depicting a block filling operation in a fantasyizing process in an embodiment.

FIG. 17 is a flowchart depicting the procedure for a points-issuing process in an embodiment.

FIG. 18 is a sequence diagram depicting a group processing operation in an embodiment.

FIG. 19 is an explanatory diagram depicting an example of a group processing operation in an embodiment.

FIG. 20 is an explanatory diagram depicting an example of a group processing operation in an embodiment.

FORMS FOR EMBODYING THE PRESENT INVENTION

An embodiment of a game system and a game program, according to the present embodiment, will be explained in detail below, referencing the appended drawings.

(Overall Structure of the System)

FIG. 1 is a conceptual diagram depicting the overall structure of a game system according to the present embodiment. The game system according to the present embodiment, as illustrated in FIG. 1, is structured basically from a smartphone 1, which is a mobile terminal device used by a user 10, and a game server 3 that is located on the Internet 2. Note that in the present embodiment a smartphone 1 will be explained as an example of a mobile terminal device.

The game server 3 is a server for carrying out game progress processing in the present embodiment, and can be achieved through a single server machine or a plurality of server machines, where a plurality of function modules is structured virtually on a CPU(s), where processes are executed through cooperation of the individual function modules. Moreover, the game server 3 is able to send and receive data over the Internet 2 through a communication function, and is also able to display web pages via browser software, through a web server function.

The smartphone 1 is a mobile information processing terminal device that uses wireless communication, where a relay point, such as a wireless base station 22, communicates via wireless signals with the mobile telephone device, to enable communication services, such as voice communication and data communication, to be received during travel. The communication system of the mobile telephone device may be, for example, a 3G (third generation) system, an LTE (Long Term Evolution) system, a 4G system, an FDMA system, a TDMA system, a CDMA system, or W-CDMA, or may be a PHS (Personal Handyphone System) system, or the like. Moreover, "smartphone 1" includes also mobile computers such as tablet PCs, or the like, in which a variety of functions, such as a digital camera function, a function for executing application software, a function for acquiring location information through GPS (Global Positioning System), or the like, and so forth are provided.

The location information acquiring function is a function for acquiring and storing location information that indicates the location of the device, where the location information acquiring function may be, for example, a method for detecting the location of the device through a signal from a satellite 21, as in a GPS, for example, as illustrated in FIG. 1, or a method for detecting the location through the strength of a radio signal from a mobile telephone wireless base station 22 or a Wi-Fi communication access point.

Additionally, the smartphone 1 is provided with a liquid crystal display as a displaying portion for displaying information, and is also provided with an operating device, such as operating buttons, for the user to carry out input operations, where the operating device may be a touch panel as an inputting portion for acquiring an operation signal through a touch operation that designates a coordinate location on a liquid crystal display, disposed superimposed on the liquid crystal display. Specifically, the touch panel is an inputting device for inputting an operation signal through detection of pressure or an electrical charge through a touch operation by the user using a fingertip, a pen, or the like, and is structured through layering together a liquid crystal display, for displaying graphics, and a touch sensor for receiving an operation signal corresponding to a coordinate location on a graphic that is displayed on the liquid crystal display.

(Internal Structures of the Individual Devices)

The internal structures of the various devices for structuring the game system described above will be explained next. FIG. 8 is a block diagram depicting the internal structure of a game server 3 according to the present embodiment, and FIG. 9 is a block diagram depicting the internal structure of a smartphone 1 according to the present embodiment. Note that the term "module," used in the explanation, indicates a functional unit for achieving a prescribed operation, structured through hardware, such as an apparatus, a device, or the like, through software that has the function, or through a combination thereof.

(1) Game Server

The internal structure of a game server 3 will be explained first. The game server 3 is a server machine that is located on the Internet 2, and carries out exchange of data with individual smartphones 1 through the Internet 2. The game server 3 comprises: a communication interface 31 for carrying out data communication through the Internet 2; an authenticating portion 33 for authenticating the user and the user terminal authorities; a location information controlling portion 32 for collecting and controlling location information of each individual user terminal; a game progress processing portion 36 for executing game progress procedures for each individual user; a virtual map information controlling portion 37 for generating virtual map information; a 34 for distributing game data to the various users; and a group of various databases. Additionally, the game server 3 according to the present embodiment is provided with a depth information controlling portion 39, as a module for an augmented reality displaying system.

The database group includes: a real map database 35a as a real map storing portion for storing real map information that includes geographical information in the real world; a user database 35b for storing information regarding users; a game database 35c for storing virtual map information, information relating to the game progress process for the game as a whole and game progress process for each of the individual users; a point database 35d for controlling points that have been issued; and a depth information database 35e. These various databases may be a single database, or may be divided into a plurality of databases, and may be formed as a relational database wherein the various data are linked to each other through the establishment of relationships therebetween.

The real map database 35a is a storage device for storing real map information that includes geographical information in the real world, storing natural geographic elements (such as mountains, valleys, rivers, and the like), artificial objects (such as buildings, roads, railways, and the like), along with place names, addresses, traffic constraints, and so forth. The real map information includes text information relating to geographical information, such as, for example, place names, political district names, street names, names of rivers, mountains, and the like, and so forth. Note that the real map database 35a may be a map database that is owned and operated by the service provider itself that operates the game server 3, or may be a map database that is operated by a separate map service provider.

The information stored in the user database 35b includes authentication information that links an identifier (user ID and/or terminal ID) for identifying the user or the mobile terminal device used by the user with a password, or the like, along with user personal information that is linked to the user ID, the model of the terminal device, and so forth. Moreover, the user database 35b stores also the authentication history (access history) for each individual user or each individual user terminal, information regarding game progress for each individual user, through relationships with the game database 35c (the latitude/longitude, etc., of the current location, status and score in the game, use history, and the like), relevant payment settlement information during the game, and so forth.

The information accumulated in the game database 35c includes data for the game, such as virtual world map information, characteristics of characters and objects, information relating to event processes, graphic information, and the like, and also mapping data for connecting these game data to geographic elements, buildings, roads, railways, and the like, that are included on the real map. The point database 35d controls issued points linked to users, user terminals, or applications, and stores a history of use of the various points.

The depth information database 35e is a database device for storing depth information that combines real images and images uploaded from individual smartphones 1, onboard cameras of information collecting vehicles, and the like, along with depth information that is the result of analysis thereof. This depth information stores: the colors and brightnesses of the pixels that structure the various images and the real images, along with the coordinate locations thereof in the images; location information (latitude and longitude, altitude, imaging direction, tilt angle, etc.); information relating to the relative distances from the imaging subjects during imaging; and correlation information for the correlations between these various types of information. Moreover, the depth information database 35e includes location information for the imaging subjects, specified by the respective depth information (latitude, longitude, altitude, height) and information regarding the shapes or heights of the buildings or topographic features located on the real map included in the real map information in the real map database 35a.

The authenticating portion 33 is a module for performing an authentication process for each individual communication session that is established, through establishing communication sessions with the individual smartphones 1 through the communication interface 31. The authentication process acquires authentication information from the smartphone 1 of the user who is the accessing party, and references the user database 35b to identify the user, or the like, to authenticate the authorities thereof. The authentication results by the authenticating portion 33 (the user ID, authentication timestamp, session ID, and the like) are sent to the game progress processing portion 36 and are also stored as authentication history in the user database 35b.

The location information controlling portion 32 is a module that acquires the location information that is acquired by the user terminal device side and transmitted to the game server 3, where the location information controlling portion 32 stores, as use history, the identifier of the user or user terminal device that is identified by the authentication process by the authenticating portion 33 (the user ID, terminal ID, or the like), linked to the location information, in the user database 35b. The location information acquired here includes the coordinates (latitude, longitude, and altitude, and imaging on the real map and the virtual map), and imaging orientation, from when the image was taken by the imaging portion, and also the date and time at that moment.

The game progress processing portion 36 is the module that causes the game to progress in the virtual world by moving each of the characters that correspond to the individual users, the monsters, and other objects, and generating a variety of event processes, and that executes a given game program that includes rules, logic, and algorithms, to generate event processes such as encounters/battles, minigames, playback of movies, fantasyizing of blocks, and the like, depending on positional relationships of characters or objects (proximity, contacts, or the like). In particular, the game progress processing portion 36 executes a process for moving a character C1 in the virtual world depending on the current location of an individual user, based on location information of the individual user that is acquired from the location information controlling portion 32, and depending on the number of points owned by the individual user, and also executes event processing so as to produce effects that are produced through movement of the character in the virtual world, such as producing effects equal to the character C1 actually walking, such as fantasyizing on the map, obtaining items, and the like.

Note that, in the present embodiment, the game progress processing portion 36 cooperates with a game progress processing portion 141 on the smartphone 1 side, so that a portion of the game progress processing is carried out by the game server 3 side, and a portion of the graphic processing, event processing, and the like, is executed by the game progress processing portion 141 on the smartphone 1 side. For example, on the game server 3 side, an event process that may be produced based on the location of the character of another user, the location of an object, or the like, is forecasted, the event conditions are generated on the game server 3 side, those conditions are transmitted to the smartphone 1 side, and the actual generation of the event processes and the graphic processes is performed on the smartphone 1 side based on the event conditions received from the game server 3 side.

The virtual map information controlling portion 37 is a module for administering and controlling the generation, storage, and distribution of virtual map information M2 that includes object coordinate information for characters of other users, buildings, and the like, in the virtual geographical information that corresponds to geographical information on the real map information M1, as depicted in FIG. 2, accompanying progress of the game by the game progress processing portion 36. In the present embodiment, points Tp are issued depending on the distance actually traveled by a user 10 on the real map information M1, where a character C1 that corresponds to the user 10 travels on the virtual map information M2 through spending of these points Tp, enabling blocks B0 that are adjacent to the path of travel to be fantasyized.

The fantasyized block B0 is virtual display data that shows a state wherein virtual objects are disposed on the real map information M1, where the real map information M1 is covered, partially or completely, by this block B0, and virtual objects that are disposed on the virtual map information M2 are displayed in the part that is covered by the block B0. Note that text information relating to the geographical information of the real map information M1 that corresponds to the display location of each fantasyized block is displayed on the fantasyized block B0, as related information, so as to be visually recognizable on the fantasyized block, as depicted in FIGS. 14 (a) and (b). Moreover, when this fantasyized block B0 is superimposed and composited on real map information M1 that is displayed in three dimensions, it is displayed, together with three-dimensional display of the real map information M1, as three-dimensional shapes that have been processed similarly into three dimensions. Virtual objects, such as monsters M0, and the like, are placed in the fantasyized block, where, through the augmented display processing of the present embodiment, the virtual objects, such as these monsters M0, or the like, are superimposed on, and displayed with, the real image when a real image is captured by the camera 121 at the current location on the real map information M1.

Given this, in this fantasyizing, as depicted in FIGS. 14 (a) and (b), through a user touching a block B0, which is divided into a shape corresponding to a city block that is adjacent to the path, the block B0 that has been touched will be fantasyized, where various types of blocks B2 through B5 are displayed superimposed on the city blocks of the real map information M1 in the virtual map.

Note that points Tp may be applied to the user depending on the frequency or interval of accessing the game server, or may be purchased through a monetary payment or points, through a payment settlement operation by the user, a billing process on the server side, or the like. Moreover, the points Tp may be applied arbitrarily through completion of a prescribed event in the game, a score in a minigame, or the like, leveling-up of a character, clearing a level, or the like.

Note that the virtual map information M2 may be generated on the game server 3 side, may be generated on the smartphone 1 side, or may be generated through cooperation of both the game server 3 and the smartphone 1, where the virtual map information controlling portion 37 controls the virtual map information M2 that is generated and stored on the game server 3 side, and the information, regarding the virtual map information M2, that is generated and stored on the smartphone 1 side, and compares both of these virtual map information M2, and, as necessary, performs synchronization of the two through distributing, to the smartphone 1 side, either the entirety of, or a portion of, the virtual map information M2.

When the virtual map information M2 is generated on the game server 3 side, the virtual map information controlling portion 37 acquires the geographic elements, buildings, roads, railways, and the like, that are included in the real map information M1 that is stored in the real map database 35a, and also references the mapping data that is stored in the game database 35c, to generate the virtual map information M2 through dividing map information of the virtual world into block B0 units, based on map information for the virtual world that corresponds to the real map information M1, characteristics (attributes) of characters and objects, information regarding event processes, graphic information, and the like.

The game data distributing portion 34 is a module for distributing, to individual users through the communication interface 31, map information and virtual world graphics to synchronize the virtual map information M2 generated by the virtual map information controlling portion 37, following control by the virtual map information controlling portion 37, based on the current location of the user. Note that the virtual world graphics are divided into blocks for each individual city block corresponding to the real map information M1, and distributed by the block unit. Note that the divisions between blocks may be such that the areas and shapes are automatically changed depending on the speed of movement of the user in the virtual world, the speed of movement in the real world, and information density on the real map or the virtual map. For example, if the speed of movement of the user is fast, the block division unit area may be made larger, or in a region wherein buildings, stores, and the like, are concentrated and the information density is high, such as in a city center, the division unit area may be made smaller.

Moreover, the depth information controlling portion 39 is a module that, in cooperation with the image analyzing portion 145a on the smartphone 1 side, analyzes captured information that has been uploaded by the information user terminals and by onboard cameras, and the like, of information collecting vehicles, to analyze depth information, and also has a function for storing, in the depth information database 35e, the depth information that is the result of the analysis, and also for distributing the depth information that results from the analysis through a communication interface 31 to various terminals. Moreover, the depth information controlling portion 39 comprises a learning processing portion 39a, where, in this learning processing portion 39a, learning is carried out through referencing a general account for correlations between the colors and locations, within the image, of the pixels that structure the images, location information at the moment of imaging, and the relative distances calculated by the image analyzing portion 145a. This learning processing portion 39a has a function for correcting the correlation information that is included in the analysis results, based on information relating to the shapes or heights of the buildings or topographic features that are included on the real map.

(2) Smartphone 1

The internal structure of the smartphone 1 will be explained next. As illustrated in FIG. 9, the smartphone 1 comprises: a communication interface 11, as a module related to the user interface for the game system; an input interface 12; an output interface 13; an application executing portion 14; and a memory 15.

The communication interface 11 is a communication interface for carrying out data communication, and is provided with functions for non-contact communication, through radio signals, or the like, and for contact (physically wired) communication, through a cable, adapter means, or the like. The input interface 12 is a device for inputting a user operation, such as of a mouse, keyboard, operating button, touch panel 12a, or the like. The output interface 13 is a device for outputting images and sounds, such as a display, a speaker, or the like. In particular, a displaying portion 13a, such as a liquid crystal display, or the like, is included in the output interface 13, where the displaying portion is superimposed on the touch panel 12a that is the input interface.

The memory 15 is a storage device for storing the OS (Operating System), firmware, various types of application programs, other data, and the like, where, in addition to the user ID for identifying the user, game application data that is downloaded from the game server 3 is stored in the memory 15, and game data, and the like, processed by the application executing portion 14, is also stored therein. In particular, in the present embodiment, the virtual map information M2 and real map information M1 that is acquired from the game server 3 is stored in the memory 15. The virtual map information M2 is stored by block units that have been divided into shapes corresponding to the city blocks in the real map information M1.

The application executing portion 14 is a module for executing applications, such as a general operating system, game applications, browser software, and the like, and normally is embodied by a CPU, or the like. In this application executing portion 14, a game progress processing portion 141, a synchronization processing portion 142, an event processing portion 143, a display controlling portion 146, a display data generating portion 145, and a location information acquiring portion 144 are structured virtually through execution of a game program according to the present invention.

The game progress processing portion 141 is a module that advances the game through moving, in the virtual world, the individual characters corresponding to the individual users, along with monsters and other objects, and through generating a variety of event processes, through the same rules, logic, and algorithms as the game program that is executed by the game server 3, and, through the synchronization processing portion 142, synchronizes with the game progress processing portion 36 of the game server 3 side, to generate event processes, such as encounters/battles, minigames, playback of movies, fantasyizing of blocks, and the like, depending on positional relationships with characters and objects (proximity, contact, or the like).

In the present embodiment, the game progress processing portion 141 cooperates with the game progress processing portion 141 of the game server 3 side, so that a portion of the game progress processing portion 141 is carried out on the game server 3 side, and a portion of the graphic processing and event processing is executed by the game progress processing portion on the smartphone 1 side. For example, the conditions for generating an event are generated on the game server 3 side and these conditions are sent to the smartphone 1 side, and the actual generation of event processes, and the graphic processes related thereto, are executed on the smartphone 1 side.

The synchronization processing portion 142 is a module for synchronizing the game progress processing and image analysis processing on the smartphone 1 side and the game progress processing and image analysis processing on the game server 3 side. Specifically, on the game server 3 side, event processes that may occur are forecasted based on the locations of characters of other users, locations of objects, and the like, and the event conditions thereof are generated on the game server 3 side, where those conditions are transmitted to the smartphone 1 side, the event conditions are received by the synchronization processing portion 142, and the actual generation of event processes, and the graphic processes related thereto, are executed by the game progress processing portion 141 on the smartphone 1 side based on the event conditions received from the game server 3. The results of event processes that have been executed by the game progress processing portion 141 on the smartphone 1 side (victory/loss, or score of battles and minigames, fantasyizing of city blocks, and the like) are sent to the game progress processing portion 141 of the game server 3 side through the synchronization processing portion 142, to be applied to the game progress processing thereafter.

Moreover, the synchronization processing portion 142 causes the depth information controlling portion 39 on the game server 3 side and the display data generating portion 145 on the smartphone 1 side to cooperate to upload captured images from the individual user terminals, onboard cameras of information collecting vehicles, and the like, and to perform captured image analysis to analyze depth information. Moreover, the synchronization processing portion 142 stores, in the depth information database 35$e$ on the game server 3 side, the depth information that results from the analysis, and also distributes, to individual terminals through the Internet 2, the depth information that results from the analysis, so as to share this depth information between the various terminals. Additionally, the synchronization processing portion 142 causes the learning processing portion 39$a$ on the game server 3 side and the image analyzing portion 145$a$ on the smartphone 1 side to cooperate to learn, through a deep learning function, referencing correlation information between the colors and locations, within the image, of the pixels that structure the images, location information at the moment of imaging, and information relating to the relative distances calculated by the image analyzing portion 145$a$.

Moreover, the event processing portion 143 is a module that monitors the event processes generated by the game progress processing portion 141 and the travel speed of the current location of the device, acquired by the location information acquiring portion 144, and if the travel speed of the current location is equal to or greater than a prescribed value and the event process generated by the game progress processing portion 141 is an event for which group processing is possible, enables group processing in the event process, where the game progress processing portion 141 is structured so as to enable a group completion operation, instead of a plurality of standard operations, in events wherein group processing is possible, to enable progress in the game through abbreviated operations. The synchronization processing portion 142 provides notification to the game progress processing portion 141 on the game server 3 side regarding event processes performed with abbreviated operations by the event processing portion 143, and reports to the game server 3 side that the game has progressed through abbreviated operations for the event process for which the event process event conditions have been satisfied.

The location information acquiring portion 144 is a module for selecting and acquiring coordinate locations in the real world, to acquire the current location of the user and the current locations of other users through a global positioning system (GPS) that uses artificial satellites, through base station positioning through triangulation of the location based on a station information and the strength of radio signals from base stations, through Wi-Fi positioning using SSIDs (Service Set IDs) and states of Wi-Fi radio signals, and a database that combines the longitudes and latitudes thereof, or the like.

Moreover, the location information acquiring portion 144 is able to select an arbitrary coordinate location, to acquire location information, to measure speed of travel, etc., based on a user operation or an event that occurs in the course of the game. Additionally, the location information acquiring portion 144 is provided also with a function for acquiring the coordinate locations of arbitrary objects, and is able to search the various databases 35$a$ through $c$ to acquire current coordinate locations or coordinate locations on the virtual map, and the travel histories thereof.

In particular, the locations of placement at arbitrary locations on the real map information or the virtual map information of an arbitrary object, as a proxy object where the object is a proxy for the user, can be searched and acquired from the various databases 35$a$ through $c$. The location, on the map information, of the proxy object is caused to travel automatically, in accordance with the progress of the game, by the game progress processing portion 36 or 141 and is linked to the current location of a specific user, and is caused to travel automatically in accordance with the progress of the game.

Moreover, in measuring a speed of travel by the location information acquiring portion 144, instantaneous movement can also be detected through a detection signal from an acceleration sensor 16, to evaluate that the user is in motion if an acceleration beyond a prescribed value is produced. Moreover, if, in the measurement of the travel speed, there is high-speed travel through, for example, the user riding in a vehicle, the user being in motion is evaluated through a change in the GPS value. In regards to this high-speed travel, if GPS signals cannot be received (when, for example, underground in a subway, or the like, or in a train station), the location information is updated through switching of Wi-Fi or of base stations in 3G, 4G, or the like, or changes in the state of reception of radio signals, where this location information is monitored, and the user is evaluated as traveling if the change in the location information is greater than with normal travel through walking. Note that in the travel evaluation through, for example, switching of base stations, the change in location information will be discontinuous, and thus the travel distance and travel speed of the user is estimated, with a given margin, depending on the distance between base stations, and/or the amount of change in the radio signals, at given time intervals (for example, every five minutes) after the evaluation that the user is traveling.

Moreover, in the present embodiment the location information acquiring portion 144 is provided with a travel path recording portion 144$a$, where this travel path recording portion 144$a$ is a module that calculates and records the travel path and travel speed based on the travel history of individual users or objects, such as the current location of the user, the current location of another user, the coordinate location of an arbitrary object, and the like, acquired from the location information acquiring portion 144. The calculation of the travel path by the travel path recording portion 144$a$ can determine, for example, the travel path that is the shortest distance connecting between two adjacent points in a time series of the individual locations that are sampled, or can determine the path along a route between the two points through referencing geographical information.

The display data generating portion 145 is a module for generating display data for displaying on the displaying portion 13$a$. The display data is graphic data, or image data, text data, video data, or data generated through combining with audio or other data. In particular, the display data generating portion 145 in the present embodiment achieves the functions of a real display data generating portion for generating real display data that displays the current location of the user on the real map information M1 based on the current location of the user, acquired by the location information acquiring portion 144, and of a virtual display data generating portion for generating virtual display data for displaying the character on virtual map information M2 corresponding to the current location of the user based on the current location acquired by the location information acquiring portion 144. The display process for the display data generated by the display data generating portion 145 is controlled by the display controlling portion 146.

This display data generating portion 145 comprises a virtual map information generating portion, where the virtual map information generating portion is a module for generating virtual map information M2, including coordinate information for characters of other users, fantasyized blocks, and the like, on the virtual geographical information corresponding to the geographical information of the real map information M1, as depicted in FIG. 2, in accordance with the game progress by the game progress processing portion 141. The virtual map information generating portion acquires geographic elements and buildings, roads, railways, and the like, that are included in the real map information M1 that is stored in the memory 15 or in the real map database 35*a* on the network, and also references mapping data that is stored in the memory 15 or in the game database 35*c*, to generate map information for the virtual world based on the map information for the virtual world that corresponds to the real map information M1, and on characteristics of characters and objects, information regarding event processes, graphic information, and the like. In the example depicted in FIG. 2, virtual objects such as forests, mountains, crags, and the like, are located at the coordinate locations (coordinate ranges) corresponding to buildings in the real map information M1.

Note that while, in the present embodiment, the virtual map information M2 is generated by the virtual map information generating portion on the smartphone 1 side, the virtual map information M2 that corresponds to the geographical information of the real map information M1 may be generated in advance or in real time by the virtual map information controlling portion 37 of the game server 3 and synchronized through distribution to the individual smartphones 1 through the game data distributing portion 34.

The display controlling portion 146 is a module for executing control so as to display the real display data and the virtual display data, generated by the display data generating portion 145, with both of these display data, or selected display data, or a portion of one superimposed on the other, where the displaying portion 13*a* displays the real display data and the virtual display data following control by the display controlling portion 146.

Additionally, the display controlling portion 146 in the present embodiment comprises a track displaying portion. The track displaying portion is a module that displays, as a track on the real map information M1 or the virtual map information M2, the travel path of the applicable user, the travel path of another user, and/or the travel path of an arbitrary object, recorded by a travel path recording portion 144*a*. The display of the track by the track displaying portion may be through coloration, with a given width, of a travel path that is determined by connecting, with the shortest distance between two adjacent points in time series order for each of the locations that have been sampled, for example, or through coloration, with a given width, of a path that is determined along a route between two points, through referencing geographical information. Moreover, in the display of the track by the track displaying portion, partitions or objects that are near to the travel paths of the individual users or objects, in the real map information M1 or the virtual map information M2, may be displayed in color, as a portion of the track.

The partitions may be displayed through coloration by block units such as partitioning administrative districts, city blocks, municipalities and prefectures, cities, towns and neighborhoods, or the like, based on actual geographical information and/or virtual geographical information. Even in coloration by the block unit, blocks that are in contact with a travel path that is determined by connecting the shortest distance between two adjacent points may be colored, or blocks that are in contact with paths that are determined along a route between two points, referencing geographical information, may be colored.

Moreover, the display data generating portion 145 in the present embodiment, as illustrated in FIG. 10, comprises, as modules relating to the augmented reality displaying system, and image analyzing portion 145*a*, a virtual display data generating portion 145*b*, and an augmented reality display processing portion 145*e*.

The virtual display data generating portion 145*b* is a module for generating virtual display data, such as computer graphics, to be superimposed on the real image as augmented reality, and generates virtual display data that represents the state of positioning of virtual objects on the real map information that includes geographical information in the real world, based on the location information acquired by the location information acquiring portion 144. The virtual display data that is generated is inputted into the augmented reality display processing portion 145*e*.

The image analyzing portion 145*a* is a module for analyzing, as depth information, the relative distances from the imaging subjects for the individual pixels that structure the image wherein the real world is captured (a real image). In the present embodiment, the image analyzing portion 145*a* comprises a parallax analyzing portion 145*c* and a relative distance calculating portion 145*d*.

The parallax analyzing portion 145*c* is a module for analyzing the parallax of an image at at least two points that are physically separated, to compare the images at the at least two points, to identify buildings and topographic features that appear in the image. The result of analysis by this parallax analyzing portion 145*c* is inputted into the relative distance calculating portion 145*d*. The relative distance calculating portion 145*d* calculates the relative distances from the imaging subjects based on the parallax of the images analyzed by the parallax analyzing portion 145*c*, and inputs the results into the augmented reality display processing portion 145*e*.

The augmented reality display processing portion 145*e* is a module for displaying the virtual display data generated by the virtual display data generating portion 145*b*, superimposed on the image captured by the imaging portion, in accordance with the depth information. In the present embodiment, the augmented reality display processing portion 145*e* comprises a layer generating portion 145*f* and a compositing processing portion 145*g*.

The layer generating portion 145*f* is a module for distributing the various pixels that structure the image into a plurality of layers that form a hierarchy in the direction of depth of the image, based on the respective depth information of each, to generate layers based on the relative distances to the imaging subjects, calculated by the relative distance calculating portion 145d. The compositing processing portion 145g is a module for superimposing, into the actual image, the virtual display data generated by the virtual display data generating portion 145b, in accordance with depth information relating to layers generated by a layer generating portion 145f.

Note that the parallax analysis and relative distance calculation in the present embodiment is carried out through a deep-learning classifying process. In this deep-learning classifying process, correlation information is referenced regarding the correlation between the colors and locations, within the image, of the pixels that structure the images, the location information at the moment of imaging, and information relating to the relative distances, calculated by the image analyzing portion 145a, to assign, as depth information, the distance to the imaging subject for each individual pixel.

(System Operation)

In the present embodiment, an object controlling function is provided that causes travel of the character C1, and that records and displays travel tracks and fantasyized blocks in accordance with points Tp that have been spent, through spending the points Tp acquired through user travel. Moreover, the location-based game progresses through accumulating points Tp, or enlarging the fantasyized region, as the result of generating event processes, such as monsters appearing in the fantasyized blocks, defeating those monsters, and the like. The various processes will be explained below.

(1) Game Progress Processes

In the location-based game according to the present embodiment, the basic concept of the game is that a character is caused to travel in a virtual world, by the object controlling function, linked to travel of the user in the real world, and blocks corresponding to the track of this travel are fantasyized. Given this, in the location-based game according to the present system, points Tp are issued in accordance with the travel distance of the user in the real world, where these points Tp are spent to move, in an augmented reality world or in a virtual world, the character C1 that corresponds to the user, or to fantasyize blocks that correspond to city blocks, or to generate events such as battles or the appearance of monsters in the fantasyized blocks, to thereby cause the game to progress.

That is, a point issuing portion 38 is provided in the game server 3, and points are issued depending on the travel distance of the user 10, detected by the location information acquiring portion 144 on the smartphone 1 side. Here "points" is value information, having trading value, and is handled as a unit of virtual currency in the virtual world in the game. Additionally, in the present embodiment, the game advances through executing event processes such that the character C1 is moved in the virtual world, or that effects that are obtained through travel of the character in the virtual world, such as, for example, effects that are commensurate with the character C1 actually walking, such as fantasyizing on the map, obtaining items, or the like, can be produced depending on the number of points. Note that issuing of points and progression of the game, including event processes, are executed cooperatively by the game progress processing portions 36 and 141, where the game progress processes and points are recorded in the user database 35b and the game database 35c.

Additionally, in the present embodiment, points are accumulated through the cumulative distance of travel of the user, the number of times that specific facilities on the map have been accessed, and the number of repeat visits to areas that have already been fantasyized. For example, as illustrated in FIG. 15, when a user 10 repetitively travels back and forth between his home (location A) and the building Bld of his workplace, through commuting, or the like, points Tp are applied depending on the frequency thereof, and the fantasyizing process, described above, becomes possible through spending these points Tp. That is, it becomes possible to spend the points Tp to fantasyize the blocks between location A and building Bld, where a block that has been fantasyized is touched to display that block superimposed on the real map. Moreover, in the present embodiment, points acquired in an area that has already been fantasyized can be used to remotely fantasyize even a block B0u in an area that has not yet been visited, as depicted in FIG. 16 (a) through (c).

Note that, in the present embodiment, the color of the track of the commuting path will be more intense, and the state of the fantasyized block will be different, depending on the number of times the track has been traveled. Moreover, the number of times a specific facility (the building Bld in this case) has been accessed (the number of trips) is also counted by the track record, where points are issued depending on this count, enabling these points to be used to enable use of a variety of special events. These special events may be the ability to fantasyize a block that has not been visited, the ability to obtain a special item, or the like, through points that have been accumulated.

Moreover, in the present embodiment, the states of blocks that have been fantasyized will transition depending on the amount of time that has elapsed and on the progress of the game. Specifically, as illustrated in FIG. 12 and FIG. 13, points Tp are issued depending on the distance of travel of the user 10, and these points Tp are spent to move the character C1, corresponding to the user 10, on the real map information M1. Through this travel of the character C1, the blocks corresponding to the city blocks along the path of travel can be fantasyized through the user touching the screen (phase F1). At the time of this fantasyizing, points Tp are spent for each block. Additionally, the state of the fantasyized blocks will change as time elapses or as the game progresses, as illustrated in FIG. 13.

First, as the character C1 travels, the information for the real map information M1 will be displayed as a blank map, as a block B1 in a non-tapped state, for the blocks that are adjacent to the path of travel. The block B1, in the non-tapped state, is fantasyized, such as the activated block B2, through a "current location tap" operation, touching the untapped block B1 (phase F1). Note that an unvisited block B6, which is away from the travel path, may also be fantasyized through spending points Tp, through a "remote block tap" operation wherein an unvisited block is touched (phase F6). Note that the unvisited block B6 that has been fantasyized through the remote block tap will have a different image displayed than when fantasyizing through the normal current location tap.

As time elapses, the activated block B2 that has been fantasyized will transition to an activated block B3, which has been upgraded to be in a "sparkling state," or the like, wherein vegetation, such as a forest, or the like, has grown (phase F2). Note that it is possible to cause a transition to this "sparkling state" immediately, without waiting for time to elapse, through the use of a special item such as an "accelerating agent," that can be obtained through spending points Tp. In this activated block B3 that has been upgraded to transition to the "sparkling state," it is possible to tap the block to execute an event process such as cutting wood in a forest or harvesting grain. Points or items can be obtained through a harvest event process, where the fantasyizing is resetted to transition into an inactive block B4 (phase F3). In the inactive block B4, fantasyizing is disabled for a given time interval, through prohibition of the tap operation for a prescribed time interval, in a state waiting for the time interval to elapse. Thereafter, when the prescribed time interval has elapsed, the inactive block B4 transitions to an activated block (non-tapped state) B5 (phase F4), enabling fantasyizing and growth again through a tap operation (phase F5). The state of the fantasyized block transitions in a cyclical sequence in this way, maintaining the game performance even for regions that have already been conquered.

(2) Augmented Displaying Process

The augmented reality displaying process according to the present embodiment will be explained next. The steps in the augmented reality display process are depicted in FIG. 3 through FIG. 7. As described above, in the present embodiment a character of the virtual map information M2 is moved linked to movement of the user 10 on the real map information M1, and partitions (such as city blocks, or the like), corresponding to the movement path, are fantasyized, as depicted in FIG. 2. The fantasyized block B0 is virtual display data that shows a state wherein virtual objects are disposed on the real map information M1, where the real map information M1 is covered, partially or completely, by this block B0, and virtual objects that are disposed on the virtual map information M2 are displayed in the part that is covered by the block B0. Note that text information relating to the geographical information of the real map information M1 that corresponds to the display location of each fantasyized block is displayed on the fantasyized block B0, as related information, so as to be visually recognizable on the fantasyized block.

Moreover, as illustrated in FIG. 3, virtual objects C2, other than the user, are located in the virtual map information M2, and the virtual objects C2 can be displayed through compositing with the image that is captured of the real world (FIG. 4 (a)) so as to appear, as augmented reality, at the locations in the real world corresponding to the locations thereof on the virtual map (FIG. 4 (b)). In the displaying process for the augmented reality, virtual display data, such as computer graphics, and the like, generated by the virtual display data generating portion 145b, are composited with the real image that is captured by the camera 121 of the smartphone 1, and displayed on the touch panel 12a of a smartphone 1, or the like.

Describing this in detail, the virtual display data generating portion 145b generates virtual display data that represents the state wherein a virtual object C2 is located on the real map information M1, based on the user location information. On the other hand, the image analyzing portion 145a analyzes, as depth information, the relative distances to the imaging subjects for the individual pixels that structure a real image G1 that has been captured by the camera 121. During this analysis of depth information, the image analyzing portion 145a accesses the depth information database 35e to reference the results of learning by the learning processing portion 30a that are stored in the depth information database 35e.

In the parallax analyzing portion 145c of the image analyzing portion 145a, the distances to the imaging subjects, obtained through analysis of parallax of images G11 and G12, captured by cameras Cm1 and Cm2 at at least two points that are physically separated from each other, as illustrated in FIG. 5 and FIG. 6, are stored, in relation to the location information at the imaging locations, in the depth information database 35e.

That is, the parallax analyzing portion 145c compares the images G11 and G12, captured by the cameras Cm1 and Cm2 at two points, to identify imaging subjects Ob1 through Ob5 that are buildings, topographical features, or the like that appear in the images G11 and G12. The relative distances to the imaging subjects Ob1 through Ob5 is calculated, in the relative distance calculating portion 145d, based on the parallax for the images G11 and G12, analyzed by the parallax analyzing portion 145c, to calculate, as depth information, the depths for each of the pixels that structures each of the imaging subjects, that is, the distances (depths) from the location of the camera to the imaging subjects.

Note that the parallax analysis and relative distance calculation in the present embodiment is carried out through a deep-learning classifying process. In the deep-learning classifying process, correlation information that is the correlation between the colors and locations, within the image, of the pixels that structure the images, location information at the moment of imaging (latitude, longitude, altitude, orientation, date and time, etc.), and information regarding the relative distances, calculated by the image analyzing portion 145a, are stored as the depth information. Given this, for the image that is subject to analysis, the relative distance calculating portion 145d references the location information from the time of imaging, extracts correlation information matching the characteristics of the individual pixels, and references the depth information that is tied to the correlation information, to identify the distances to the imaging subjects for each of the pixels.

Describing this in detail, in the present embodiment the learning processing portion 39a uses, as teaching data, images captured by two camera devices that are physically separated, or a large number of images captured while traveling, through an onboard camera device, or the like, that is installed in an imaging vehicle, to extract hierarchically a plurality of characteristics for each pixel that structures the images, and stores, as depth information in the depth information database 35e, patterns wherein the extracted characteristics are combined hierarchically. Given this, when displaying augmented reality on a smartphone 1, the depth information that has been stored in the depth information database 35e is referenced to identify imaging subjects within the real image, to calculate the depth, to those imaging subjects, for the real image that has been captured by the camera 121 (which here is only a single image).

A summary of the classifying process by the learning processing portion 39a is shown in FIG. 11. As depicted in this figure, the learning processing portion 39a is a multi-class classifier, where distinctive features of a plurality of types of objects are set, and parallax images G11 and G12 that have been captured by two camera devices that are physically separate are analyzed to detect, from among the plurality of objects, an object Obn (which here is a building) that includes the specific characteristics. This learning processing portion 39a has an input unit (input layer) 397, first weighting coefficients 398, a hidden unit (hidden layer) 399, second weighting coefficients 390, and an output unit (output layer) 391.

A plurality of distinctive feature vectors 392 are inputted into the input unit 397. The first weighting coefficients 398 weight the outputs from the input unit 397. The hidden unit 399 performs non-linear conversion of linear combinations of the outputs of the input unit 397 and the first weighting coefficients 398. The second weighting coefficients 390 weight the outputs from the hidden unit 399. The output unit 391 calculates the classification probability for each of the classes (for example, multistory buildings, small houses, open space, etc.). While three output units 391 are depicted here, there is no limitation thereto. The number of output unit 391 is equal to the number of objects that can be detected by the object classifier. Moreover, during this learning, weighting may be performed through the correlation between the characteristics of the individual pixels and location information on the real map.

Additionally, the learning processing portion 39a references the depth information that includes the hierarchical combination patterns of the characteristics of the individual pixels that have been stored in this way, and the image analyzing portion 45a calculates classification probabilities depending on the degree of match of the combination patterns for the characteristics with the real image captured by the camera 121, to classify the imaging subjects in the image depending on the calculation results, where the distances to the imaging subjects from the location of the camera are calculated and outputted as depth information for each of the pixels included in each imaging subject.

In the augmented reality display processing portion 145e, the virtual display data generated by the virtual display data generating portion 145b (which here is two-dimensional display data for a character C2) is superimposed on or composited with an image captured by the camera 121 (which here is a single real image), to be displayed in accordance with the depth information that includes the relative distances to the imaging subjects, calculated by the image analyzing portion 45a. Specifically, as illustrated in FIG. 7, based on the depth information for each of the individual pixels, the layer generating portion 145f distributes each of the pixels that structure the image (the real image G1) to a plurality of layers Ly1 through Ly5 that form a hierarchy in the direction of depth of the real image G1, and then, in the composite processing portion 145g, the two-dimensional display data of the character C2 is superimposed into the real image depending on the respective depth information for the individual layers Ly1 through Ly5 that were generated by the layer generating portion 145f.

(3) Points Issuing Process

FIG. 17 is a flowchart depicting the process in the points issuing process, described above, in the present embodiment. As depicted in this figure, during execution of the game program on the smartphone 1 of the user 10, a process for acquiring location information and a process for calculating travel speed are executed, either constantly or periodically, and are reported to the game server 3 (S101). Specifically, the location information acquiring portion 144 acquires, as location information, values detected by an acceleration sensor 16, movement of the current location of the user, latitude and longitude through GPS, base station measurement positioning through triangulation based on radio signal strength and base station information, changes in base station measurement positioning through Wi-Fi measurement positioning using a database that combines SSIDs (Service Set ID) and radio signal states for Wi-Fi and longitude/latitude information, as location information.

In the game server 3 that receives the reports of the location information from the user terminal, the cumulative path of each user is recorded (S201), and the amount of travel (cumulative travel distance) is calculated and stored for each user. The recording of the cumulative path is continued until an amount of travel of at least a given value has been accumulated ("N" in S202), and when the amount of travel of at least the given value has been stored ("Y" in S202), a number of points that depends on that amount of travel is issued as value information (S203). The issued points are received through downloading, or the like, by the user on the smartphone 1 side (S102).

On the smartphone 1 side for the user, the character C1 may be moved on the virtual map information M2 depending on the points received (S104), or those points may be saved. Additionally, if the user 10 continues to move, so that issuing of points is repeated ("N" in S103), so that at least a specific amount of points is accumulated ("Y" in S103), it becomes possible to use a special event, such as fantasyizing a block path that is adjacent to the path, or fantasyizing an unvisited block, or use in purchasing an item, or the like (S105). Special events can be selected and used depending on the number of points, or the user can select arbitrarily a special event that can be used, to be executed through a use request operation. The use request operation is carried out based on an event generation process that depends on the number of points.

When the user selects the use of an event, the event is deployed in accordance therewith, and through a touch operation by the user, fantasyizing of an adjacent block or unvisited block is carried out (S105), and the result of the operation is reported to the game server 3. When an event deployment report is received by the game side, a process for advancing the game, based on the deployed event, is executed (S204). The issuing of points, described above, and the deployment of events through the accumulation and use of points, can be repeated ("N" in S106 and S205) until the game is ended ("Y" in S106 and S205).

(4) Group Input Operation Process

The group input process at the time of an event will be explained next. In the present embodiment, if, for example, a monster M0, or the like, that is present in a fantasyized block, is nearby, the game progress processing portion 141 executes an event process such as a battle, or the like, when the monster is encountered. The augmented displaying process of the present embodiment enables virtual objects, such as monsters M0, and the like, to be displayed on a screen superimposed on a real image, even when processing events, such as battles.

In the game progress processing portion 141 according to the present embodiment, an input interface controlling function is provided for performing, as single operations or group-completed operations, operations that should actually be inputted individually, for each monster during an event process when an event process is generated through an encounter with monsters when passing through an event generating region. In this game progress processing portion 141, normally individually inputted steps are executed wherein input of user operations is received individually for each of a plurality of the individual applicable process (such as monsters M0, or the like) that appear in standard event processes; however, based on a selection operation by the user, instead of individual input steps, a group-completion operation step is provided wherein it is possible to input a single group-completion operation for processing, in a group, a plurality of monsters. When processing all of the plurality of monsters, the game advances with the event processing carried out through inputting of this group-completion operation.

Here, for the individual input that is normally carried out, the method may be, as depicted in FIG. 20, one of inputting a sign that depends on the type of monster, such as a slash operation wherein a diagonal line is inputted quickly on the touch panel ((a) in the figure), or such as drawing a symbol, such as a circle, a X, a triangle, or the like, on the touch panel ((b) in the figure), etc., for each individual monster that appears in the battle. Note that, through the augmented displaying process according to the present embodiment, the virtual objects, such as monsters M0, and the like, can be displayed on the screen, superimposed on the real image, even in battle screens wherein virtual objects, such as monsters M0, or the like, appear, as depicted in this figure.

On the other hand, as a group-completion operation, the operation may be one wherein the smartphone 1 is tilted, for example, as depicted in FIG. 19, so as to move the monsters off the screen all at once, or an operation wherein the monsters are shocked to death en masse through shaking the smartphone 1, or an operation wherein a noise is generated through the pressure of an airflow on the microphone by blowing toward the microphone. Note that life points or levels are set, as threshold values that are required to complete the process, for each of the plurality of monsters that are to be subjected to the process, where only those monsters wherein the threshold value is no greater than a prescribed value will be beaten by the group operation input, with individual inputs, described above, required for those monsters that exceed the specific threshold value.

This group input operation process will be explained in detail. FIG. 18 is a sequence diagram showing the operations regarding the event processes. First, as the game advances, location information is acquired by each individual smartphone 1 periodically, and transmitted to the game server 3 (S401 and S301). On the game server 3 side, points are issued according to the distances of travel that have been transmitted for each of the users (S302), and the issued points are transmitted to the smartphone 1 side and applied to the user (S303). On the smartphone 1 side, the points that have been applied are received, and the points can be used, based on a user operation, to move the character C1 on the virtual map, to fantasyize a block, or the like (S402).

Additionally, when a battle event process has been generated ("Y" in S403), and the user has selected group processing ("Y" in S404), the individual processes are skipped, and the event progresses as a group-completion operation. Moreover, if the user has not selected group processing, then, as is normal, the standard individual inputs are requested (S406). Note that while here the execution of group processing is possible through an arbitrary selection operation by the user, but instead, for example, the speed of travel of the current location of the smartphone 1 may be acquired by the location information acquiring portion 144 on the smartphone 1 side, with group processing executed forcibly on event processes when the speed of travel of the user is greater than a prescribed value. In this case, the game progress processing portion 141, for a group processing-compatible event, forcibly selects the group-completion operation instead of a plurality of standard operations, to cause the progression of the game by completing the battle through omitting the individual input operations. In this case, if the speed of travel of the user is greater than the prescribed value, the levels of the monsters that appear in the battle may be reduced, so as to increase the success rate of the group completion.

On the one hand, through group processing ("Y" in S404), when all monsters have been beaten ("Y" in S405), the event process has been performed, so the game progress processing portion 141 on the game server 3 side is performed through the synchronization processing portion 142 (S407), and the synchronization process is performed on the game server 3 side (S304), where the result of the event process that has been executed is reflected in the game progress processes thereafter (S305). On the other hand, when group processing was not selected in Step S404 ("N" in S404), or not all of the monsters were beaten in the group processing ("N" in S405), then individual standard inputs are received (S406), and the battle develops and is executed as normal. After the battle has been completed, the result is transmitted to the server side, to perform a synchronization process (S407), and, at the game server 3 side that has received the report, the synchronization process is performed (S304), and the results of the battle are reflected in the game progress processing thereafter (S305). The processes described above are repeated ("N" in S408) until the game is ended, and when a game process operation is performed ("Y" in S408), the game is terminated.

Operations and Effects

As explained above, the present invention enables an improvement in the entertainment value through achieving diversification of augmented reality through the ability to display appropriately front/back relationships and a sense of distance of the imaging subjects in an image, through a simple process, when compositing through superimposing virtual objects into a real image of the real world through an augmented reality displaying function in a game system wherein the game progresses through execution of a variety of event processes through movement of a character, corresponding to a user, or of another object, in a virtual world.

EXPLANATIONS OF CODES

B0: Block
B0u: Block
B1: Untapped Block
B2: Activated Block
B3: Upgraded Activated Block
B4: Inactive Block
B5: Activated Block (Non-Tapped)
B6: Unvisited Block
Bld: Building
C1: Character
M0: Monster
M1: Real Map Information
M2: Virtual Map Information
Tp: Point
1: Smartphone
2: Internet
3: Game Server
10: User
11: Communication Interface
12: Input Interface
12a: Touch Panel
13: Output Interface
13a: Displaying Portion
14: Application Executing Portion
15: Memory
16: Acceleration Sensor
21: Satellite
22: Wireless Base Station
31: Communication Interface
32: Location Information Controlling Portion
33: Authenticating Portion
34: Game Data Distributing Portion
35a: Real Map Database
35b: User Database
35c: Game Database
35d: Point Database
35e: Depth Information Database
36, 141: Game Progress Processing Portion
37: Virtual Map Information Controlling Portion 38: Point Issuing Portion
39: Depth Information Controlling Portion
39a: Learning Processing Portion
45a: Image Analyzing Portion
121: Camera
141: Game Progress Processing Portion
142: Synchronization Processing Portion
143: Event Processing Portion
144: Location Information Acquiring Portion
144a: Travel Path Recording Portion
145: Display Data Generating Portion
145a: Image Analyzing Portion
145b: Virtual Display Data Generating Portion
145c: Parallax Analyzing Portion
145d: Relative Distance Calculating Portion
145e: Augmented Reality Display Processing Portion
145f: Layer Generating Portion
145g: Compositing Processing Portion
146: Display Controlling Portion
390, 398: Weighting Coefficients
391: Output Unit
392: Feature Vector
397: Input Unit
399: Unit

The invention claimed is:

1. An augmented reality displaying system for compositing and displaying virtual objects on an image of the real world wherein the image of the real world has been captured, comprising:
   an imaging portion configured to capture the image of the real world, wherein the image of the real world comprises image information from at least two points that are physically separate from each other;
   a location information acquiring portion configured to acquire location information comprising coordinates and orientation at the moment at which the image is captured;
   an image analyzing portion configured to analyze, as depth information, relative distances to imaging subjects of individual pixels that constitute the image of the real world that has been captured;
   a virtual display data generating portion configured to generate virtual display data that expresses the state of placement of virtual objects on real map information that includes geographical information in the real world, based on location information acquired by the location information acquiring portion;
   a compositing processing portion configured to display the virtual display data superimposed on the image of the real world that has been captured by the imaging portion, including color and position of each individual pixel that constitute the image of the real world; and
   a learning processing portion configured to generate correlation information between colors and locations within the image, location information at the moment of image capture, the pixels that constitute the image, relating to a relative distance at the moment of image capture, and other relative distances calculated by the image analyzing portion,
   wherein the image analyzing portion is further configured to analyze depth information of a single image of the real world using correlation results from the learning processing portion,
   wherein the learning processing portion is configured to store a distance to an object obtained by analyzing a parallax of an image captured at the two physically separate points as the correlation information in association with a hierarchical combination pattern of characteristics for each pixel and position information at the real world location of image capture, and the image analyzing portion is configured to store the correlation information, and
   wherein the image of the real world captured by the imaging portion references the correlation information and the depth information of the image of the real world to determine the degree of match to the hierarchical combination patterns.

2. The augmented reality display system of claim 1, wherein the learning processing portion is configured to correct the correlation information based on information about a height of a building, terrain, or topography contained within the image of the real world.

3. The augmented reality display system of claim 1, further comprising:
   a layer generating portion that is configured to distribute each of the pixels constituting the image to a plurality of layers that form a hierarchy in the direction of depth of the image of the real world, and is further configured to provide the plurality of layers to the compositing processing portion,
   wherein the compositing processing portion is further configured to superimpose the virtual display data on the image of the real world depending on the respective depth information for individual layers of the plurality of layers.

* * * * *